US011632575B2

(12) United States Patent
Zhang et al.

(10) Patent No.: US 11,632,575 B2
(45) Date of Patent: Apr. 18, 2023

(54) BINARIZATION OF PARTITIONING RELATED TO EXTENDED QUADTREE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 192 days.

(21) Appl. No.: 17/183,855

(22) Filed: Feb. 24, 2021

(65) Prior Publication Data

US 2021/0185362 A1    Jun. 17, 2021

Related U.S. Application Data

(63) Continuation of application No. PCT/IB2019/057239, filed on Aug. 28, 2019.

(30) Foreign Application Priority Data

Aug. 28, 2018  (WO) ................ PCT/CN2018/102727

(51) Int. Cl.
*H04N 19/96*  (2014.01)
*H04N 19/119* (2014.01)
*H04N 19/184* (2014.01)

(52) U.S. Cl.
CPC ........... *H04N 19/96* (2014.11); *H04N 19/119* (2014.11); *H04N 19/184* (2014.11)

(58) Field of Classification Search
CPC ..................................................... H04N 19/96
(Continued)

(56) References Cited

U.S. PATENT DOCUMENTS 9,077,998 B2    7/2015  Wang et al.
9,124,895 B2    9/2015  Wang
(Continued)

FOREIGN PATENT DOCUMENTS

CN    103931182 A    7/2014
CN    107005718 A    8/2017
(Continued)

OTHER PUBLICATIONS

Bross, Benjamin. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001, 2018.
(Continued)

*Primary Examiner* — Yulin Sun
(74) *Attorney, Agent, or Firm* — Perkins Coie LLP

(57) ABSTRACT

A method of video processing includes determining, for a conversion between a coded representation of a video block of a video region and the video block, that an extended quadtree (EQT) partition is enabled for at least one video block of the video region, and performing the conversion based on the determining. The EQT partition splits the video block in multiple sub-blocks such that at least one of the multiple sub-blocks has a size that is different from a half width of the video block times a half height of the video block. The coded representation of the video block is represented using a codeword from a table that includes mapping between codewords and partition types.

20 Claims, 26 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 9,247,251 | B1 | 1/2016 | Bultje |
| 9,288,506 | B2 | 3/2016 | Chen et al. |
| 9,432,685 | B2 | 8/2016 | Chon et al. |
| 9,503,702 | B2 | 11/2016 | Chen et al. |
| 9,544,566 | B2 | 1/2017 | Kang et al. |
| 9,544,601 | B2 | 1/2017 | Zhao et al. |
| 9,584,819 | B2 | 2/2017 | Wang et al. |
| 9,648,335 | B2 | 5/2017 | Rapaka et al. |
| 9,667,942 | B2 | 5/2017 | Chen et al. |
| 9,681,145 | B2 | 6/2017 | Rapaka et al. |
| 9,756,359 | B2 | 9/2017 | Zhao et al. |
| 9,769,492 | B2 | 9/2017 | Hendry et al. |
| 9,794,579 | B2 | 10/2017 | Ramasubramonian et al. |
| 9,794,626 | B2 | 10/2017 | Ramasubramonian et al. |
| 9,883,187 | B2 | 1/2018 | Tu et al. |
| 9,979,975 | B2 | 5/2018 | Rapaka et al. |
| 9,998,739 | B2 | 6/2018 | Chon et al. |
| 10,136,143 | B2 | 11/2018 | Zhang et al. |
| 10,136,162 | B2 | 11/2018 | Qu et al. |
| 10,154,269 | B2 | 12/2018 | Ye et al. |
| 10,200,700 | B2 | 2/2019 | Zhang et al. |
| 10,264,286 | B2 | 4/2019 | Ramasubramonian et al. |
| 10,375,411 | B2 | 8/2019 | Zhao et al. |
| 10,390,087 | B2 | 8/2019 | Ramasubramonian et al. |
| 10,567,799 | B2 | 2/2020 | Liu et al. |
| 10,587,897 | B2 | 3/2020 | Qu et al. |
| 10,609,423 | B2 | 3/2020 | Chuang et al. |
| 10,708,591 | B2 | 7/2020 | Zhang et al. |
| 2009/0116558 | A1 | 5/2009 | Chen et al. |
| 2014/0294084 | A1* | 10/2014 | Cheon .................. H04N 19/176 375/240.16 |
| 2015/0229957 | A1 | 8/2015 | Zhao et al. |
| 2015/0326880 | A1 | 11/2015 | He et al. |
| 2016/0330457 | A1 | 11/2016 | Ye et al. |
| 2017/0150186 | A1 | 5/2017 | Zhang et al. |
| 2017/0347095 | A1 | 11/2017 | Panusopone et al. |
| 2018/0139444 | A1 | 5/2018 | Huang et al. |
| 2019/0246143 | A1 | 8/2019 | Zhang et al. |
| 2019/0313129 | A1* | 10/2019 | Lee ........................ H04N 19/46 |
| 2020/0267418 | A1 | 8/2020 | Chuang et al. |
| 2020/0344475 | A1 | 10/2020 | Zhu et al. |

FOREIGN PATENT DOCUMENTS

| | | |
|---|---|---|
| CN | 107836117 A | 3/2018 |
| CN | 107948661 A | 4/2018 |
| EP | 3270593 A2 | 1/2018 |
| EP | 3349455 A1 | 7/2018 |
| GB | 2557430 A | 6/2018 |
| TW | 201826800 A | 7/2018 |
| WO | 2016091161 A1 | 6/2016 |
| WO | 2018088805 A1 | 5/2018 |
| WO | 2019185815 A1 | 10/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Description of SDR and HDR and 360 degree Video Coding Technology Proposal by Qualcomm and Technicolor—Low and High Complexity Versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

H.265/HEVC, https://www.itu.int/rec/T-REC-H.265.

JEM-7.0: https://jvet.hhi.fraunhofer.de/svn/svn_HMJEMSoftware/tags/ HM-16.6-JEM-7.0.

Gao et al. "CE1-2.0.11: Picture Boundary Handling," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0287, 2018.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Sullivan et al. "Overview of the High Efficiency Video Coding (HEVC) Standard," IEEE Transactions on Circuits and Systems for Video Technology, Dec. 2012, 22(12):1649-1668.

Wang et al. "Extended Quad-Tree Partitioning for Future Video Coding," 2019 Data Compression Conference (DCC), IEEE, Mar. 26, 2019, pp. 300-309.

International Search Report and Written Opinion from International Patent Application No. PCT/IB2019/057238 dated Dec. 9, 2019 (15 pages).

International Search Report and Written Opinion from International Patent Application No. PCT/IB2019/057239 dated Dec. 9, 2019 (15 pages).

International Search Report and Written Opinion from International Patent Application No. PCT/IB2019/057240 dated Dec. 6, 2019 (16 pages).

International Search Report and Written Opinion from International Patent Application No. PCT/IB2019/057241 dated Dec. 9, 2019 (15 pages).

* cited by examiner

Fig. 3. Modes for splitting a CB into PBs, subject to certain size constraints. For intrapicture-predicted CBs, only M × M and M/2 × M/2 are supported.

Fig. 4. Subdivision of a CTB into CBs [and transform block (TBs)]. Solid lines indicate CB boundaries and dotted lines indicate TB boundaries. (a) CTB with its partitioning. (b) Corresponding quadtree.

BINARIZATION OF PARTITIONING RELATED TO EXTENDED QUADTREE

CROSS REFERENCE TO RELATED APPLICATIONS

This application is a continuation of International Patent Application No. PCT/IB2019/057239, filed on Aug. 28, 2019, which claims the priority to and benefits of International Patent Application No. PCT/CN2018/102727, filed on Aug. 28, 2018. All the aforementioned patent applications are hereby incorporated by reference in their entireties.

TECHNICAL FIELD

The present document relates to the filed of video coding and compression.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Techniques for co-existence of extended quadtree partitioning and binary partitioning of blocks of video based on rules are disclosed. In one advantageous aspect, these rules enable efficient signaling of partitioned video data in a compressed video bitstream.

A first exemplary method of video processing, comprises determining, for a conversion between a coded representation of a video block of a video region and the video block, that an extended quadtree (EQT) partition is enabled for at least one video block of the video region, and performing the conversion based on the determining, where the EQT partition splits the video block in multiple sub-blocks such that at least one of the multiple sub-blocks has a size that is different from a half width of the video block times a half height of the video block.

A second exemplary method of video processing, comprises determining, for a conversion between a coded representation of a video block of a video region and the video block, that an extended quadtree (EQT) partition is enabled for at least one video block of the video region; and performing the conversion based on the determining, where the EQT partition splits the video block in multiple sub-blocks such that at least one of the multiple sub-blocks has a size that is different from a half width of the video block times a half height of the video block, and where the coded representation of the video block is represented using a codeword from a table that includes mapping between codewords and partition types.

A third exemplary method of video processing, comprises determining, for a conversion between a coded representation of a video block of a video region and the video block, that an extended quadtree (EQT) partition is enabled for at least one video block of the video region; and performing the conversion based on the determining, where the EQT partition splits the video block in multiple sub-blocks such that at least one of the multiple sub-blocks has a size that is different from a half width of the video block times a half height of the video block, where the coded representation of the video block includes one or more bits of a bin string that are encoded using a context adaptive binary arithmetic coding (CABAC) technique, and where the bin string indicates a partition type for the partitioned video block.

A fourth exemplary method of video processing, comprises determining, for a conversion between a coded representation of a video block of a video region and the video block, based on a rule whether an extended quadtree (EQT) partition is enabled for at least one video block of the video region and/or whether the video block of the video region is partitioned using a binary tree (BT) partition; and performing the conversion based on the determining.

In another example aspect, a visual media encoder device is disclosed. The encoder implements the above described method.

In yet another aspect, a visual media decoder apparatus is disclosed. The decoder implements the above-described method.

In yet another aspect, the disclosed techniques are embodied in the form of computer-executable program code and stored on a computer-readable medium.

These, and other, aspects are further described throughout the present document.

LISTING OF DRAWINGS

DETAILED DESCRIPTION

1 Summary

This patent document is related to image/video coding, especially on the partition structure, i.e., how to split one Coding Tree Unit (CTU) into Multiple Coding Units (CUs) at picture/slice borders. It may be applied to the existing video coding standard like HEVC, or the standard (Versatile Video Coding) to be finalized. It may be also applicable to future video coding standards or video codec.

2 Introduction

Figure 1:
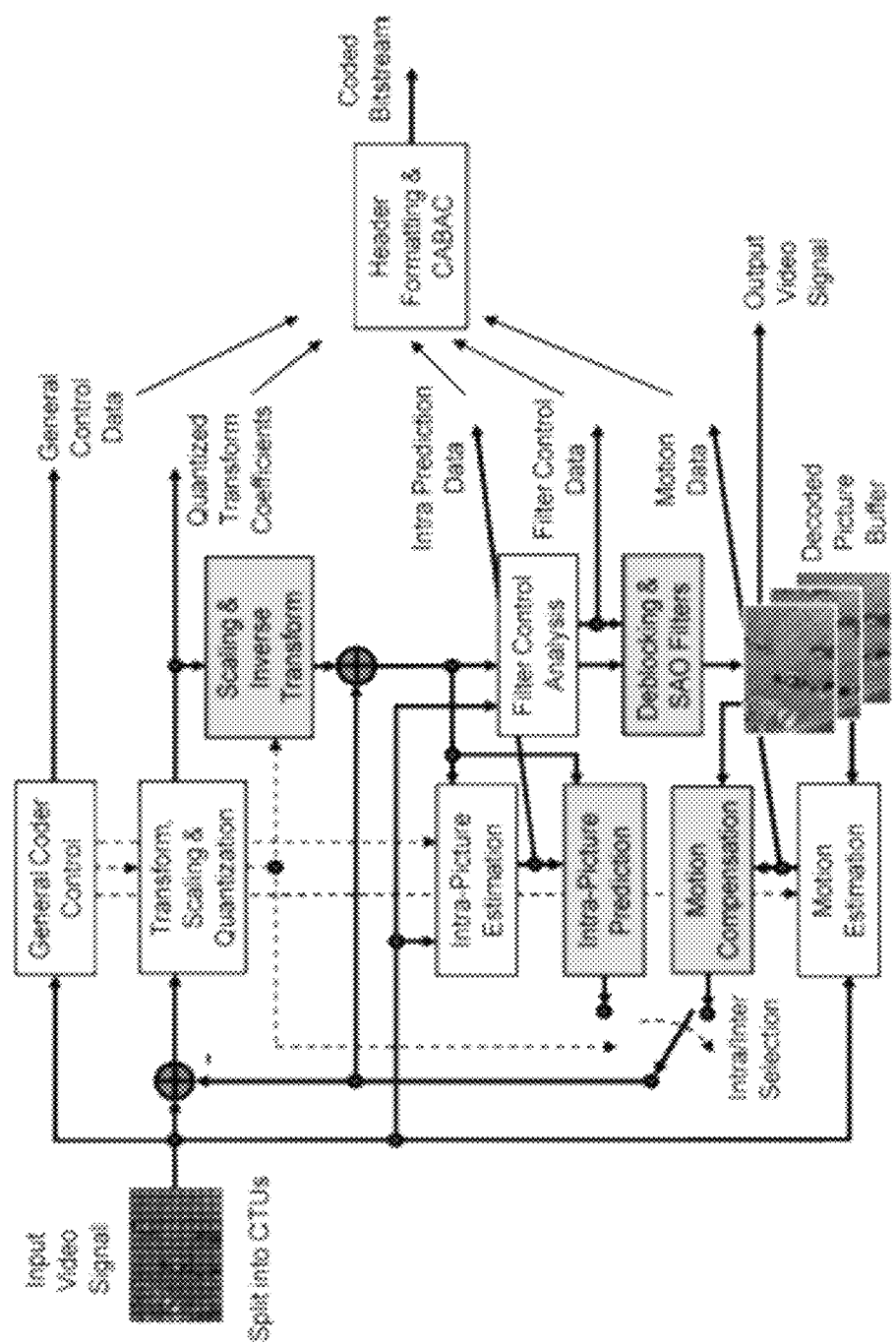
FIG. 1 is a block diagram showing an example of a video encoder implementation

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Tree Structure in H.264/AVC

Figure 2:
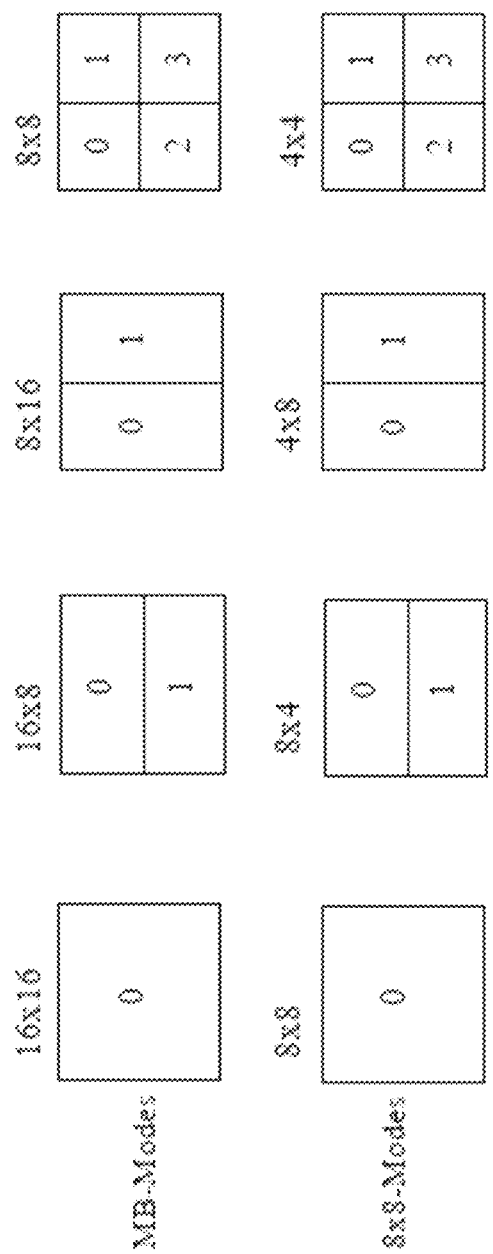
FIG. 2 illustrates macroblock partitioning in the H.264 video coding standard.

The core of the coding layer in previous standards was the macroblock, containing a 16×16 block of luma samples and, in the usual case of 4:2:0 color sampling, two corresponding 8×8 blocks of chroma samples. FIG. 2 shows examples of MB partitioning in H.264/AVC.

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 5). Only one motion vector (MV) per sub-macroblock partition is allowed.

2.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples.

Figure 3:
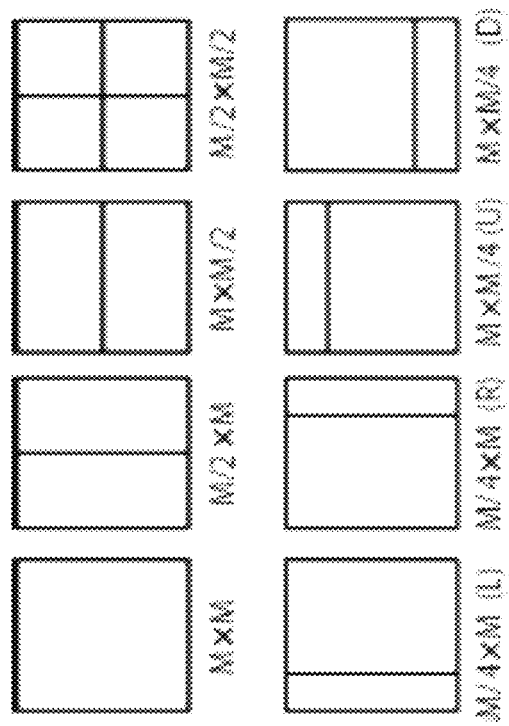
FIG. 3 illustrates an example of splitting coding blocks (CB) into prediction blocks (PB).

FIG. 3 depicts examples of modes for splitting CBs into PBs, subject to certain size constraints. For intra picture-predicted CBs, only M×M and M/2×M/2 are supported.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TBsizes 4×4, 8×8, 16×16, and 32×32. For the 4×4 transform of luma intra picture prediction residuals, an integer transform derived from a form of discrete sine transform (DST) is alternatively specified.

Figure 4:
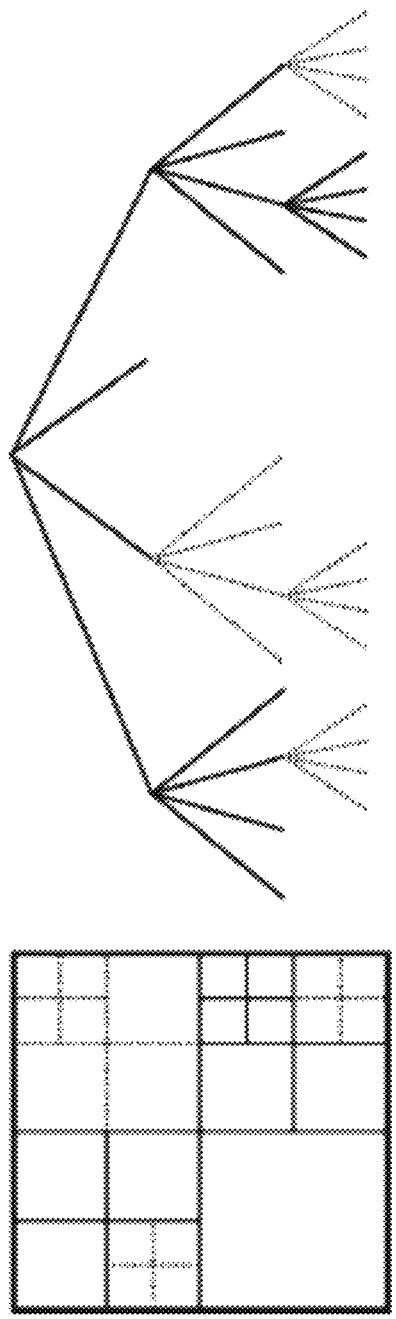
FIG. 4 illustrates an example implementation for subdivision of a CTB into CBs and transform block (TBs). Solid lines indicate CB boundaries and dotted lines indicate TB boundaries, including an example CTB with its partitioning, and a corresponding quadtree.

FIG. 4 shows example of subdivision of a CTB into CBs and transform blocks (TBs). Solid lines indicate CB boundaries and dashed lines indicate TB boundaries. Left: CTB with its partitioning, Right: Corresponding quadtree.

2.3 Quadtree plus binary tree block structure with larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT (Quadtree Plus Binary Tree) Block Partitioning Structure

Figure 5:
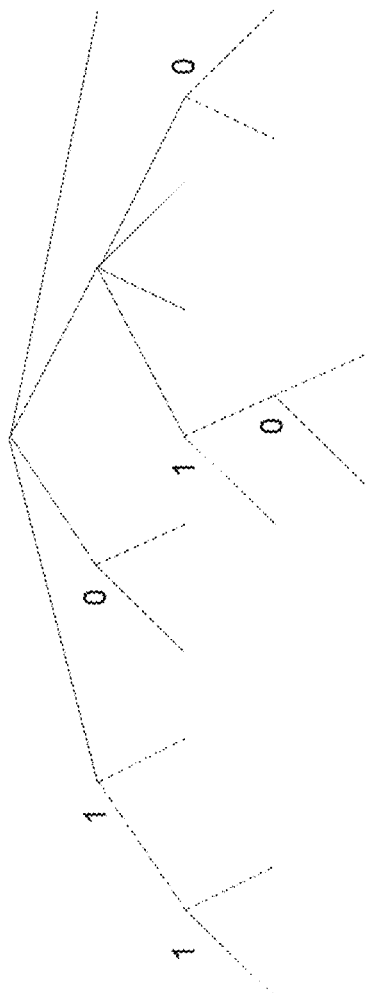
FIG. 5 shows an example of a Quad Tree Binary Tree (QTBT) structure for partitioning video data.
Figure 5:
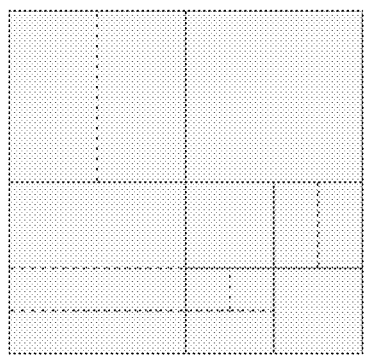

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5 (left) illustrates an example of block partitioning by using QTBT, and FIG. 5 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.4 Triple-Tree for VVC

Figure 6:
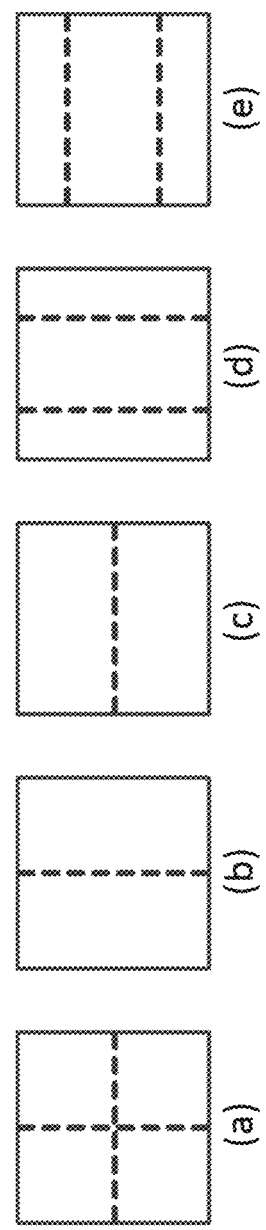
FIG. 6 shows examples of (a) quad-tree partitioning (b) vertical binary-tree partitioning (c) horizontal binary-tree partitioning (d) vertical center-side ternary-tree partitioning (e) horizontal center-side ternary-tree partitioning.

Tree types other than quad-tree and binary-tree are supported. In the implementation, two more triple tree (TT) partitions, i.e., horizontal and vertical center-side triple-trees are introduced, as shown in FIG. 6D and FIG. 6E FIG. 6(a)-6(e) depict the following. FIG. 6(a)—quad-tree partitioning FIG. 6(b) vertical binary-tree partitioning FIG. 6(c) horizontal binary-tree partitioning FIG. 6(d) vertical center-side triple-tree partitioning FIG. 6(e) horizontal center-side triple-tree partitioning There are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.5 Extended Quad Tree Examples

Figure 7A:
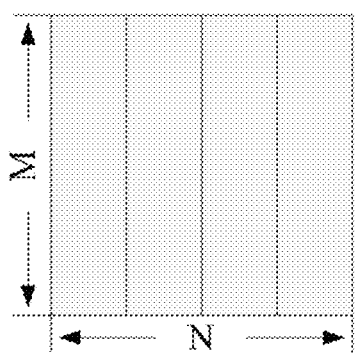
FIG. 7A to 7K illustrate examples of partitioning pixel blocks.
Figure 7B:
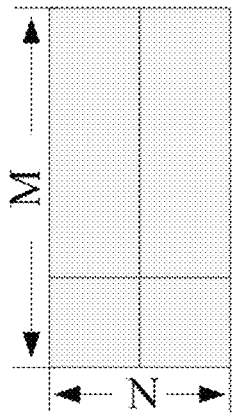

1. An extended quad tree (EQT) partitioning structure corresponding to a block partitioning process including an extended quad tree partitioning process for the block of video data, wherein the extended quad partitioning structure represents partitioning the block of video data into final sub-blocks, and when the extended quad tree partitioning process decides to apply an extended quad tree partition to one given block, said one given block is always split into four sub-blocks; decoding the final sub-blocks based on the video bitstream; and decoding the block of video data based on the final sub-blocks decoded according to the EQT structure derived.

a. The EQT partitioning process can be applied to a given block recursively to generate EQT leaf nodes. Alternatively, when EQT is applied to a certain block, for each of the sub-block due to EQT, it may further be split into BT and/or QT and/or TT and/or EQT and/or other kinds of partition trees.

b. In one example, EQT and QT may share the same depth increment process and same restrictions of leaf node sizes. In this case, the partitioning of one node could be implicitly terminated when the size of the node reaches a minimum allowed quad tree leaf node size or EQT depth with the node reaches a maximum allowed quad tree depth.

c. Alternatively, EQT and QT may share different depth increment process and/or restrictions of leaf node sizes. The partitioning of one node by EQT is implicitly terminated when the size of the node reaches a minimum allowed EQT leaf node size or EQT depth associated with the node reaches a maximum allowed EQT depth. In one example, furthermore, the EQT depth and/or the minimum allowed EQT leaf node sizes may be signaled in sequences parameter set (SPS), and/or picture parameter set (PPS), and/or slice header, and/or CTU, and/or regions, and/or tiles, and/or CUs.

d. Instead of using the current quad tree partition applied to a square block, for a block with M×N (M and N are non-zero positive integer values, either equal or unequal) size, in EQT, one block may be split equally into four partitions, such as M/4×N or M×N/4 (examples are depicted in FIG. 7A and FIG. 7B) or split equally into four partitions and the partition size is dependent on the maximum and minimum values of M and N. In one example, one 4×32 block may be split into four 4×8 sub-blocks while a 32×4 block may be split into four 8×4 sub-blocks.

e. Instead of using the current quad tree partition applied to a square block, for a block with M×N (M and N are non-zero positive integer values, either equal or unequal) size, in EQT, one block may be split unequally into four partitions, such as two partitions are with size equal to (M*w0/w)×(N*h0/h) and the other two are with (M*(w−w0)/w)×(N*(h−h0)/h)

Figure 7C:
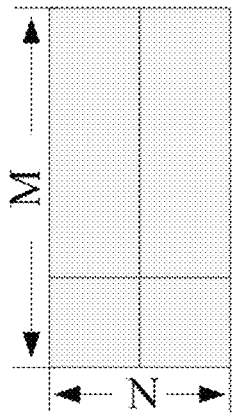
Figure 7D:
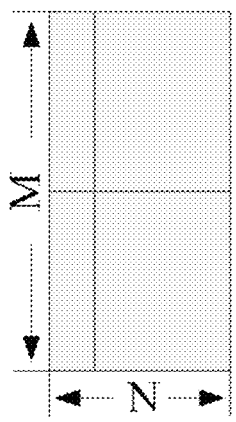
Figure 7F:
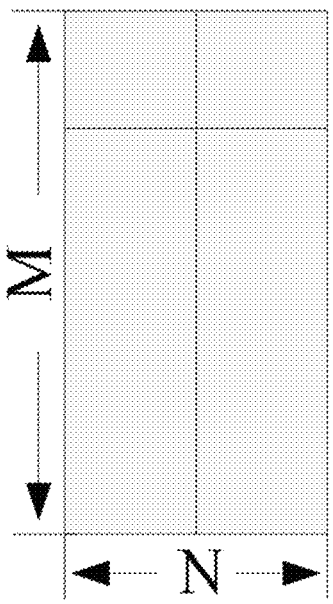
Figure 7E:
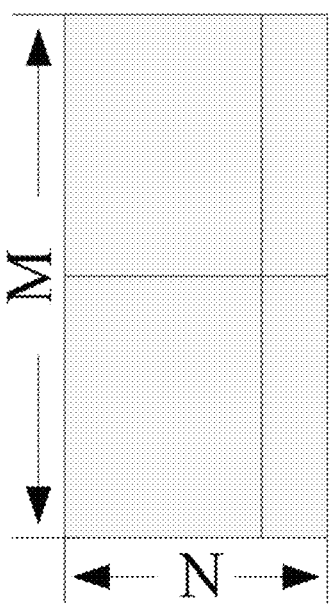

For example, w0 and w may be equal to 1 and 2, respectively that is the width is reduced by half while the height could use other ratios instead of 2:1 to get the sub-blocks. Examples for this case are depicted in FIGS. 7C and 7E. Alternatively, h0 and h may be equal to 1 and 2, respectively, that is the height is reduced by half while the width could use other ratios instead of 2:1. Examples for this case are depicted in FIGS. 7D and 7F.

Figure 7G:
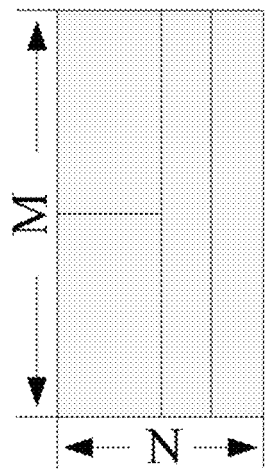
Figure 7G:
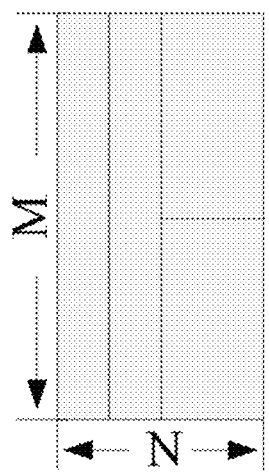
Figure 7G:
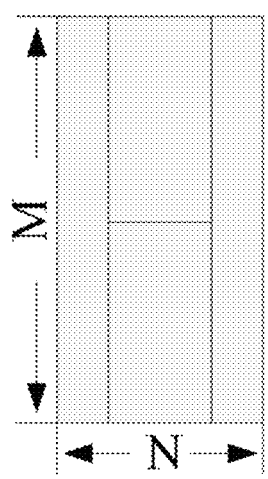
Figure 7H:
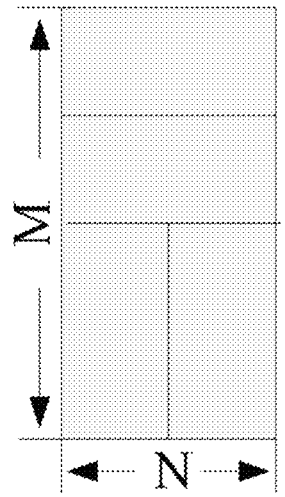
Figure 7H:
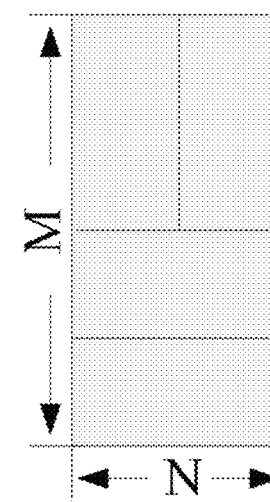
Figure 7H:
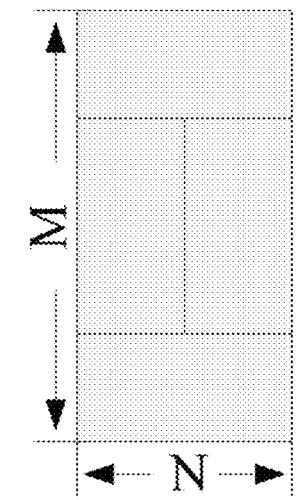

FIGS. 7G and 7H show two alternative examples of quad tree partitioning.

Figure 7J:
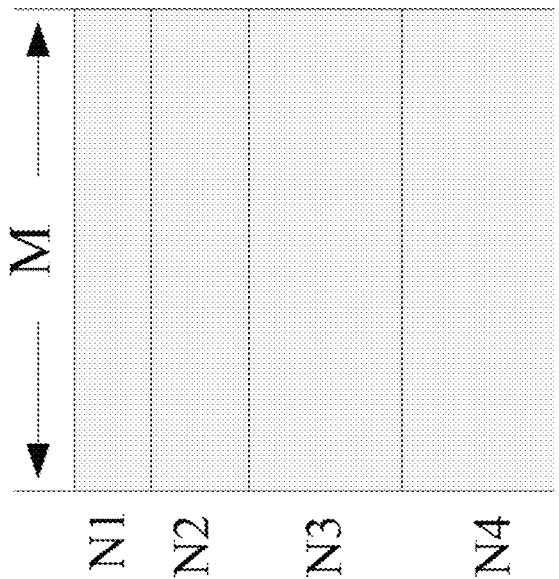
Figure 7I:
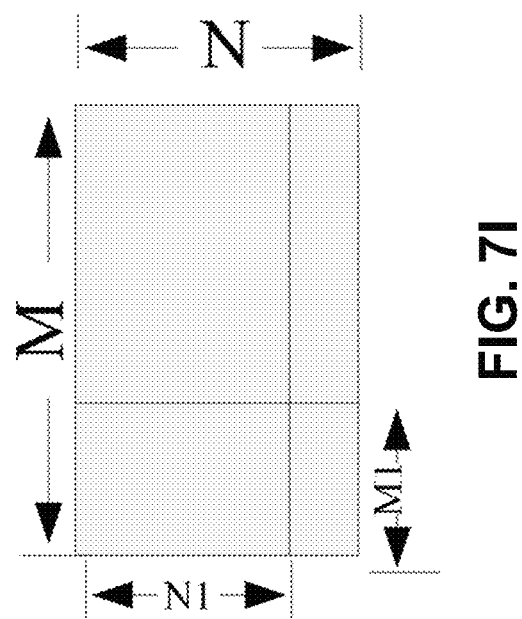
Figure 7K:
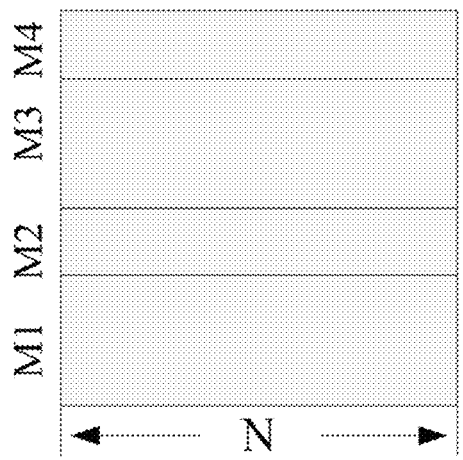
Figure 8B:
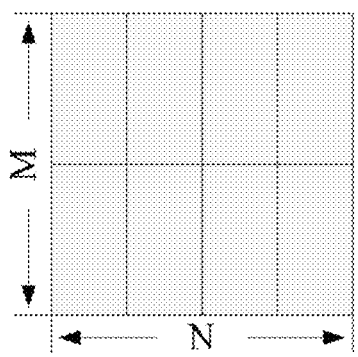
FIG. 8A to 8D shows examples of extended quadtree partitioning.
Figure 8A:
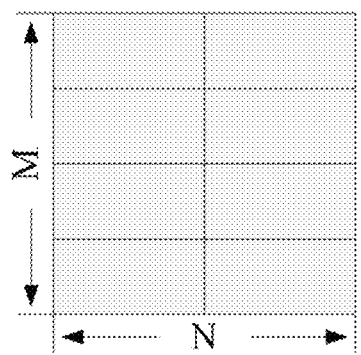
Figure 8D:
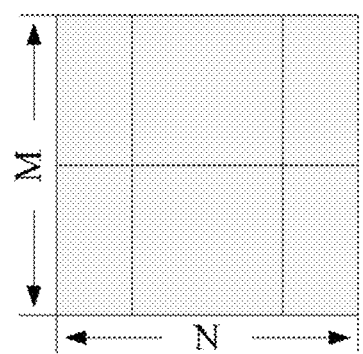
Figure 8C:
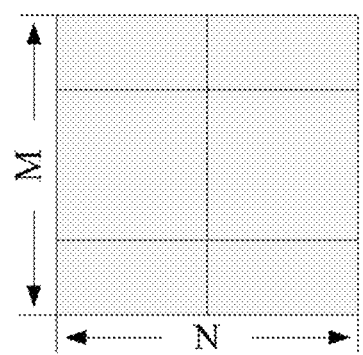

FIG. 7I shows a more general case of quad tree partitioning with different shapes of partitions FIGS. 7J and 7K show general examples of FIGS. 7A and 7B.

Collectively, FIG. 7A to 7K show the following dimensionality. (a) M×N/4 (b) M/4×N, (c) sub-block width fixed to be M/2, height equal to N/4 or 3N/4, smaller for top two partitions (d) sub-block height fixed to be N/2, width equal to M/4 or 3M/4, smaller for left two partitions (e) sub-block width fixed to be M/2, height equal to 3N/4 or N/4, smaller for bottom two partitions (f) sub-block height fixed to be N/2, width equal to 3M/4 or M/4, smaller for right two partitions (g) M×N/4 and M/2×N/2; (h) N×M/4 and N/2×M/2 (i) M1×N1, (M−M1)×N1, M1×(N−N1) and (M−M1)×(N−N1) (j) M×N1, M×N2, M×N3 and M×N4, where and N1+N2+N3+N4=N (k) M1×N, M2×N, M3×N and M4×N where M1+M2+M3+M4=M 2. A flexible tree (FT) partitioning structure corresponding to a block partitioning process including an FT partitioning process for the block of video data, wherein the FT partitioning structure represents partitioning the block of video data into final sub-blocks, and when FT partitioning process decides to apply FT partition to one given block, said one given block is split into K sub-blocks wherein K could be larger than 4; decoding the final sub-blocks based on the video bitstream; and decoding the block of video data based on the final sub-blocks decoded according to the FT structure derived.

a. The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth.

b. Alternatively, when FT is applied to a certain block, for each of the sub-block due to FT, it may further be split into BT, and/or QT, and/or EQT, and/or TT, and/or other kinds of partition trees.

c. Alternatively, furthermore, the FT depth or the minimum allowed FT leaf node sizes or the minimum allowed partition size for FT may be signaled in sequences parameter set (SPS), and/or picture parameter set (PPS), and/or slice header, and/or CTU, and/or regions, and/or tiles, and/or CUs.

d. Similar to the EQT, all of the sub-blocks due to FT partitions may be with the same size; alternatively, the sizes of different sub-blocks may be different.

e. In one example, K is equal to 6 or 8. Some examples are depicted in FIG. 8A to 8D, which show examples of FT partitioning: (a0 K=8, M/4*N/2 (b) K=8, M/2*N/4 (c) K=6, M/2*N/2 and M/4*N/2, (d) K=6, M/2*N/2 and M/2*N/4

Figures 9A, 9B:
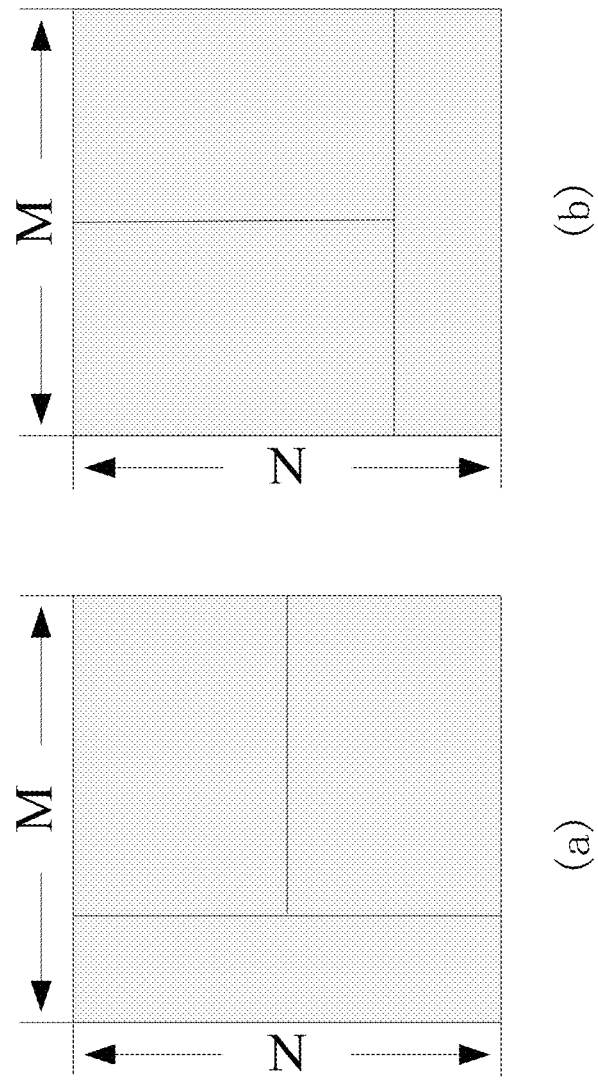
FIGS. 9A and 9B show example partitions of the largest coding unit (LCU) of video data.

3. For the TT, the restriction of splitting along either horizontal or vertical may be removed.

a. In one example, a generalized TT (GTT) partition pattern may be defined as splitting for both horizontal and vertical. An example is shown in FIGS. 9A and 9B.

4. The proposed methods may be applied under certain conditions. In other words, when the condition(s) are not satisfied, there is no need to signal the partition types.

f. Alternatively, the proposed methods may be used to replace the existing partition tree types. Alternatively, furthermore, the proposed methods may be only used as a replacement under certain conditions.

g. In one example, the condition may include the picture and/or slice types; and/or block sizes; and/or the coded modes; and/or whether one block is located at picture/slice/tile boundary.

h. In one example, the proposed EQT may be treated in the same way as QT. In this case, when it is indicated that the partition tree type is QT, more flags/indications of the detailed quad-tree partition patterns may be further signaled. Alternatively, EQT may be treated as additional partition patterns.

i. In one example, the signaling of partitioning methods of EQT or FT or GTT may be conditional, i.e. one or some EQP/FT/GTT partitioning methods may not be used in some cases, and the bits corresponding to signal these partitioning methods are not signaled.

2.6 Border Handling in JVET-K0287

In JVET-K0287, a boundary handling method is proposed to Versatile Video Coding (VVC). A similar method is also adopted into AVS-3.0.

Since the forced quadtree boundary partition solution in VVC is not optimized. JVET-K0287 proposed the boundary partition method using regular block partition syntax to keep the continuity of context adaptive binary arithmetic coding (CABAC) engine as well as matching the picture boundary The versatile boundary partition obtains the following rules (both encoder and decoder):

Using exactly same partition syntax of the normal block (non-boundary) (for instance, VTM-1.0 like FIG. 10) for boundary located block, the syntax need to be unchanged.

If the no split mode is parsed for the boundary CU, used forced boundary partition (FBP) to match the picture boundary.

After forced boundary partition (non-singling boundary partition), no further partition.

Figure 10:
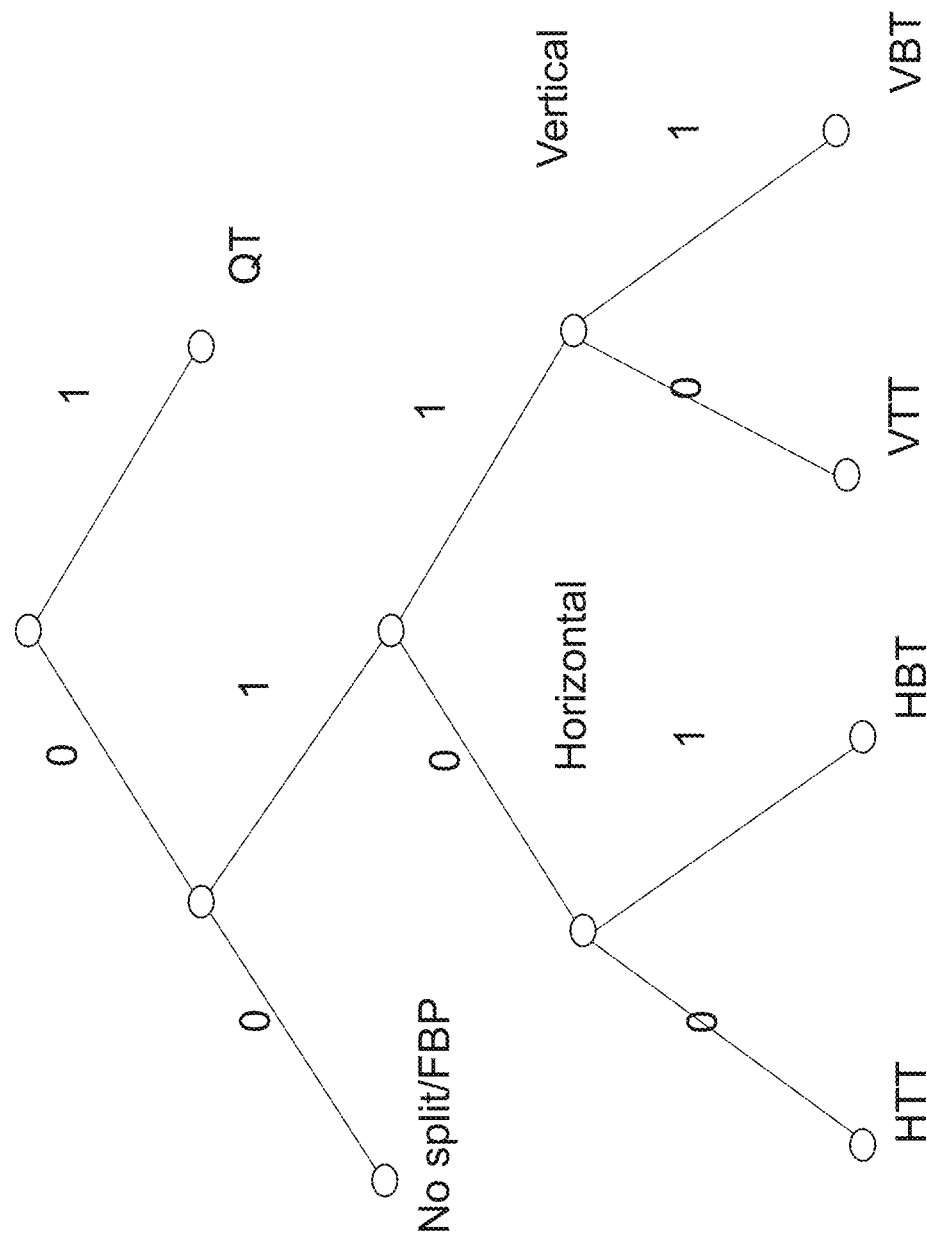
FIG. 10 shows examples of generalized ternary partitioning of an M×N block.

FIG. 10 shows an example of unchanged syntax and changed semantic for versatile boundary partition. The forced boundary partition is descripted as follow:

If the size of block is larger than the maximal allowed BT size, forced QT is used to perform the FBP in the current forced partition level;

Otherwise, if the bottom-right sample of current CU is located below the bottom picture boundary, and not extended the right boundary, forced horizontal BT is used to perform the FBP in the current forced partition level;

Otherwise, if the bottom-right sample of current CU is located at the right side of the right picture boundary, and not below the bottom boundary, forced vertical BT is used to perform the FBP in the current forced partition level;

Otherwise, if the bottom-right sample of current CU is located at the right side of the right picture boundary and below the bottom boundary, forced QT is used to perform the FBP in the current forced partition level.

3 Limitations of Current Techniques

1. There may be some redundancy between partitions of EQT and QT/BT/TT. For example, for a block with M×N, it may be split into vertical BT three times (firstly split to two M/2*N partitions, then for each M/2*N partition, further apply vertical BT split) to get four M/4*N partitions. Also, to get four M/4×N partitions, the block could choose directly using EQT as FIG. 7B.

2. How to signal EQT efficiently in the bitstream is still an unsolved problem.

4 Example Embodiments

To address the problem, and other possible improvements in video coding technology, several embodiments are proposed to handle the cases for EQT. The benefits of these embodiments are sometimes described explicitly, but will also be appreciated by one of skill in the art.

The listing below should be considered as examples to explain general concepts. These embodiments should not be interpreted in a narrow way. Furthermore, these embodiments can be combined in any manner.

Figure 11A:
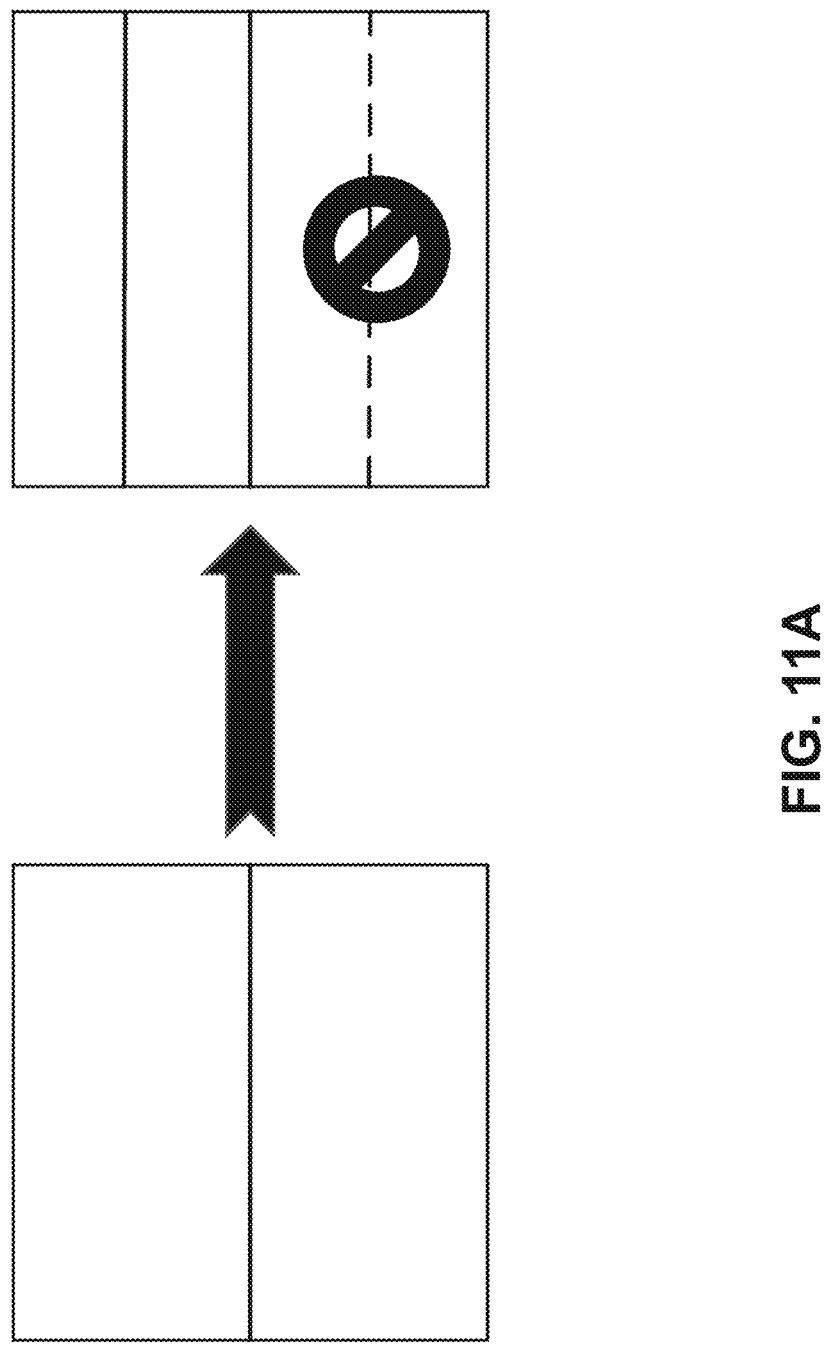
FIG. 11A to 11F depict examples of BT modes excluded from EQT partitioning.
Figure 11B:
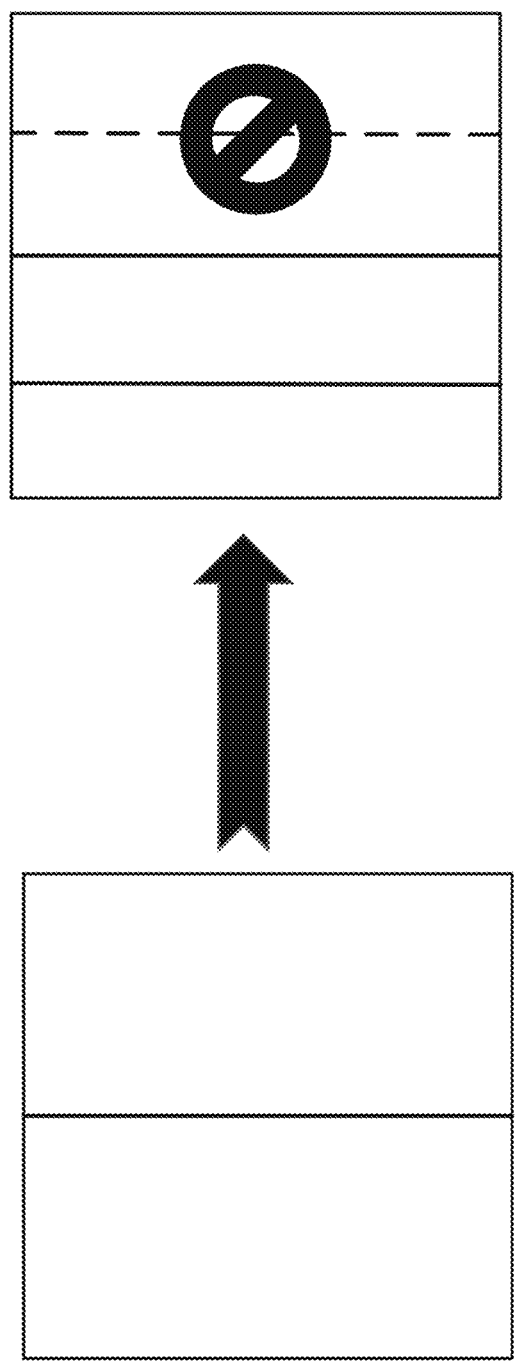
Figure 11C:
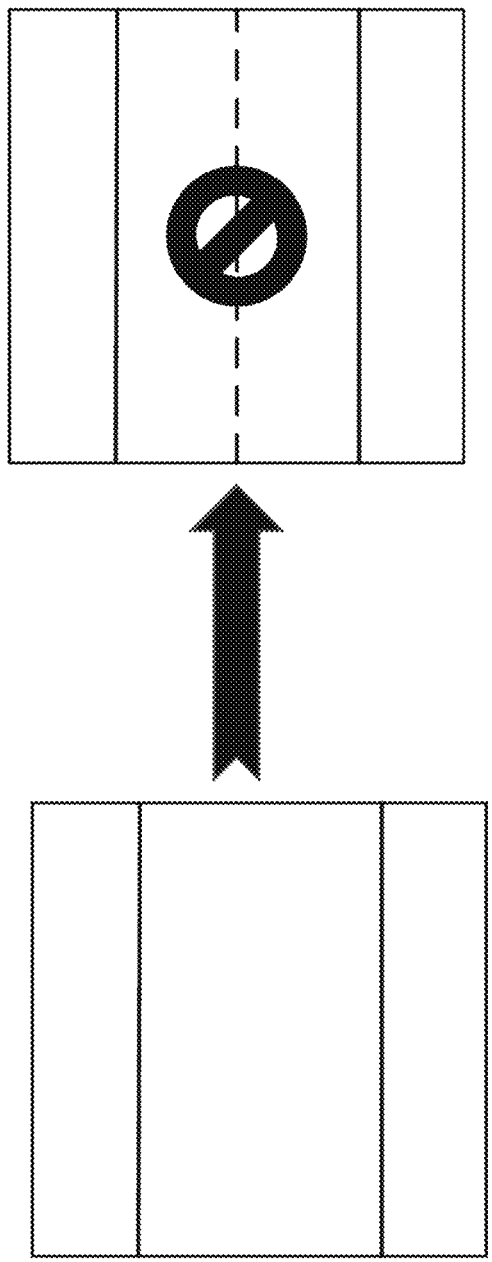
Figure 11D:
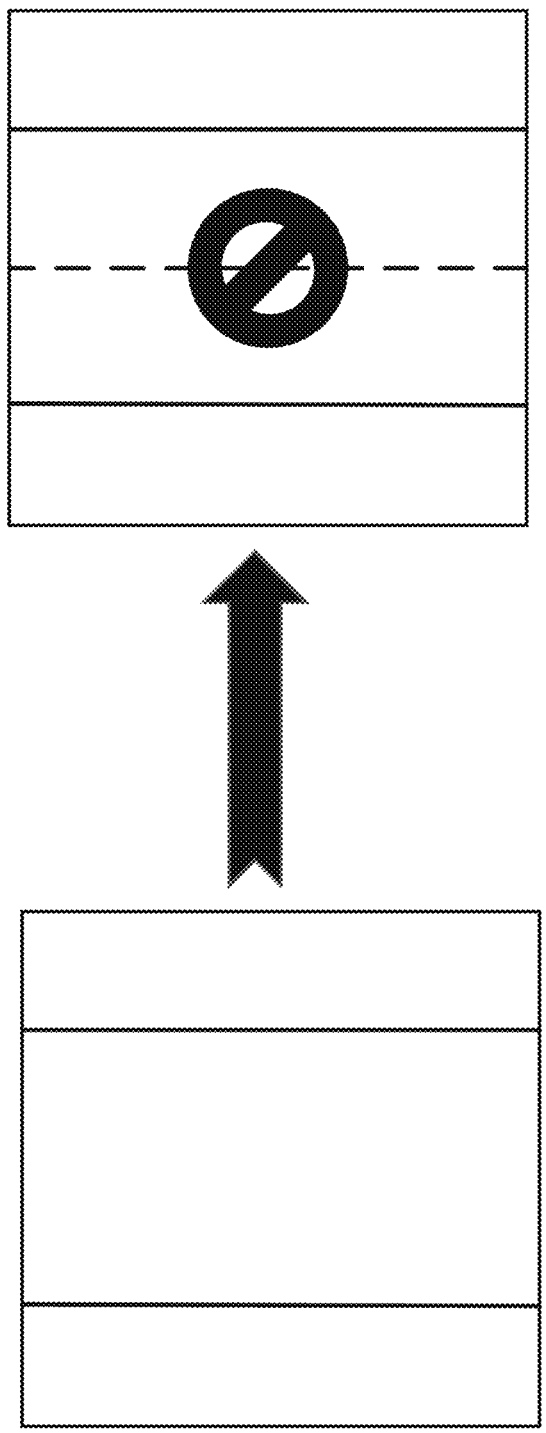
Figure 11E:
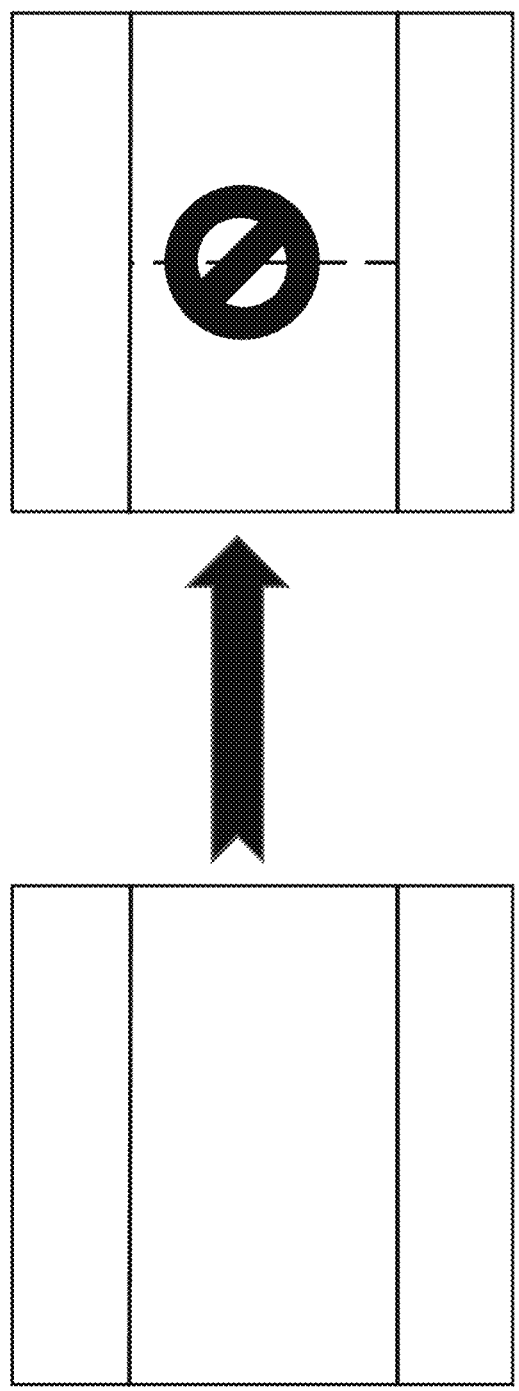
Figure 11F:
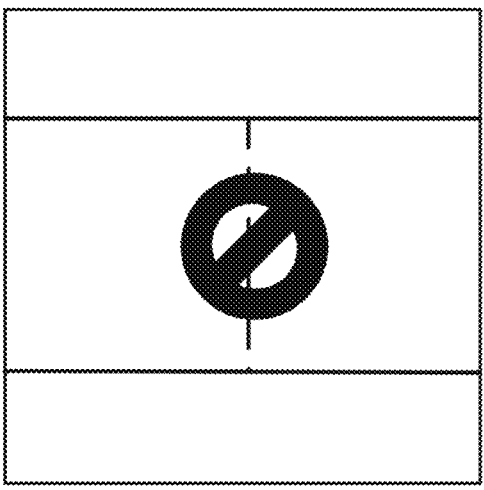
Figure 11F:
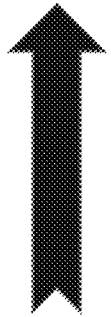
Figure 11F:
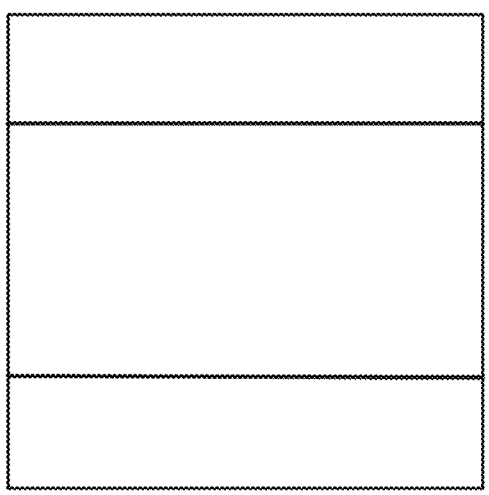

1. In one embodiment, when EQT is enabled, some BT partitions are disallowed under certain conditions. In this case, indications of the disallowed BT partitions may be signaled with methods from bullet 2 and/or bullet 3.
   a. When EQT like M*N/4 (as depicted in FIG. 7A) as is enabled, in one example as shown in FIG. 11A, horizontal BT is not allowed in a block, if it is the lower part which is split from the parent block with horizontal BT, and the upper part also split with horizontal BT.
   b. When EQT like M/4*N (as depicted in FIG. 7b) as is enabled, in one example as shown in FIG. 11B, vertical BT is not allowed in a block, if it is the right part which is split from the parent block with vertical BT, and the left part also split with vertical BT.
   c. When EQT like M*N/4 (as depicted in FIG. 7a) as is enabled, in one example as shown in FIG. 11C, horizontal BT is not allowed in a block, if it is the center part which is split from the parent block with horizontal TT.
   d. When EQT like M/4*N (as depicted in FIG. 7B) as is enabled, in one example as shown in FIG. 11D, vertical BT is not allowed in a block, if it is the center part which is split from the parent block with vertical TT.
   e. When EQT like in the left-most FIG. 7G is enabled, in one example as shown in FIG. 11E, vertical BT is not allowed in a block for the center part which is split from the parent block with horizontal TT.
   f. When EQT like in the left-most FIG. 7H as is enabled, in one example as shown in FIG. 11F, horizontal BT is not allowed in a block, if it is the center part which is split from the parent block with vertical TT.

2. In some embodiments, the syntax elements for partitioning are binarized in the same way in the condition of certain partitions are disallowed and in the condition they are allowed. The syntax signaling method is not specifically designed to avoid the non-allowed partitions. A conforming encoder must avoid choosing non-allowed partitions. Bitstreams including non-allowed partitions are considered as non-conforming bitstreams.
   a. In one example, the non-allowed partitioning cannot be signaled in a conforming bit-stream. It is the signaled, the bit-stream is determined to be non-conforming by the decoder.

3. In some embodiments, the non-allowed partitioning cannot be signaled from the encoder to the decoder, i.e. there is no codeword to represent the non-allowed partitioning.
   a. In one example as shown in FIG. 11A, there is no codeword to represent horizontal BT for a block, if it is the lower part which is split from the parent block with horizontal BT, and the upper part also split with horizontal BT.
   b. In one example as shown in FIG. 11B, there is no codeword to represent vertical BT for a block, if it is the right part which is split from the parent block with vertical BT, and the left part also split with vertical BT.
   c. In one example as shown in FIG. 11C, there is no codeword to represent horizontal BT for a block, if it is the center part which is split from the parent block with horizontal TT.
   d. In one example as shown in FIG. 11D, there is no codeword to represent vertical BT for a block, if it is the center part which is split from the parent block with vertical TT.
   e. In one example as shown in FIG. 11E, there is no codeword to represent vertical BT for a block, if it is the center part which is split from the parent block with horizontal TT.
   f. In one example as shown in FIG. 11F, there is no codeword to represent horizontal BT for a block, if it is the center part which is split from the parent block with vertical TT.

Figure 12:
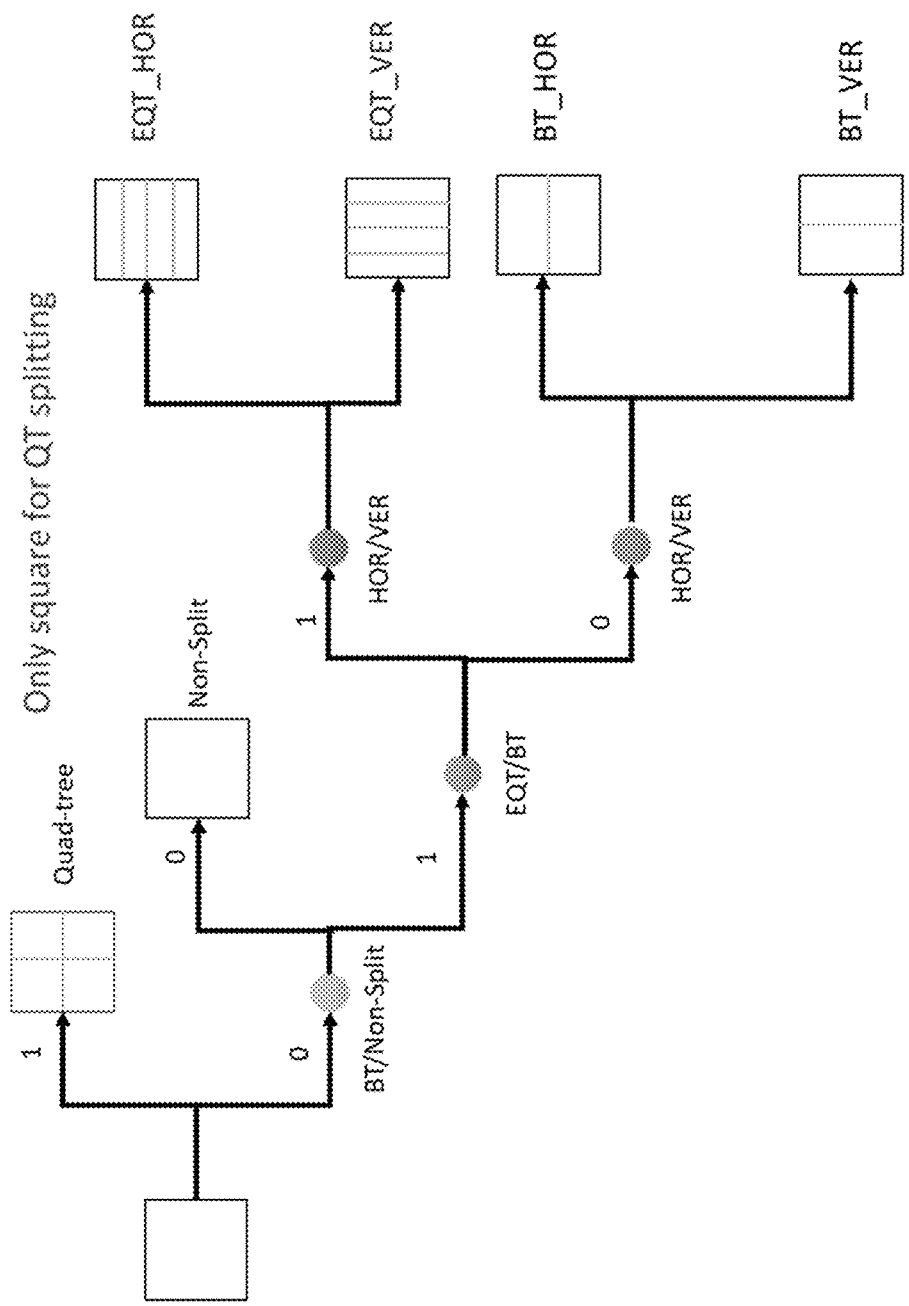
FIG. 12 shows an example of splitting a block.

4. In one example, the binarization of partitioning is shown in FIG. 12. The representation of codewords is as follows:

TABLE 1

| Codeword | Bin String | Partition types |
| --- | --- | --- |
| 0 | 1 | Quad-Tree |
| 1 | 00 | Non-Split |
| 2 | 0100 | Horizontal BT |
| 3 | 0101 | Vertical BT |
| 4 | 0110 | Horizontal EQT |
| 5 | 0111 | Vertical EQT |

It should be noted that it is equivalent to exchange all the "0" and "1" in all the tables.
   a. In one example, a flag is signaled to indicate whether BT or EQT is applied, followed by a flag indicating whether horizontal or vertical partitioning is applied.
   b. Alternatively, a flag is signaled to indicate whether horizontal or vertical partitioning is applied, followed by a flag indicating whether BT or EQT is applied. An example of the representation of codewords is as follows:

TABLE 2

| Codeword | Bin String | Partition types |
|---|---|---|
| 0 | 1 | Qual-Tree |
| 1 | 00 | Non-Split |
| 2 | 0100 | Horizontal BT |
| 3 | 0101 | Horizontal EQT |
| 4 | 0110 | Vertical BT |
| 5 | 0111 | Vertical EQT |

5. If there is no codeword to represent horizontal BT as claimed in item 3.a. An example of representation of codewords is as follows:

TABLE 3

| Codeword | Bin String | Partition types |
|---|---|---|
| 0 | 1 | Qual-Tree |
| 1 | 00 | Non-Split |
| 2 | 010 | Horizontal EQT |
| 3 | 0110 | Vertical BT |
| 4 | 0111 | Vertical EQT |

An alternative example of representation of codewords is as follows:

TABLE 4

| Codeword | Bin String | Partition types |
|---|---|---|
| 0 | 1 | Qual-Tree |
| 1 | 00 | Non-Split |
| 2 | 010 | Vertical BT |
| 3 | 0110 | Horizontal EQT |
| 4 | 0111 | Vertical EQT |

6. If there is no codeword to represent vertical BT as claimed in item 3.b. An example of representation of codewords is as follows:

TABLE 6

| Codeword | Bin String | Partition types |
|---|---|---|
| 0 | 1 | Qual-Tree |
| 1 | 00 | Non-Split |
| 2 | 0100 | Horizontal BT |
| 3 | 0101 | Vertical EQT |
| 4 | 0110 | Horizontal EQT |

An alternative example of representation of codewords is as follows:

TABLE 7

| Codeword | Bin String | Partition types |
|---|---|---|
| 0 | 1 | Qual-Tree |
| 1 | 00 | Non-Split |
| 2 | 0100 | Horizontal BT |
| 3 | 0101 | Horizontal EQT |
| 4 | 011 | Vertical EQT |

7. In one example, four types of EQT (Equal-Horizontal EQT as shown in FIG. 7A, Equal-Vertical EQT as shown in FIG. 7B, Non-Equal-Horizontal EQT as shown in FIG. 7G and Non-Equal-Vertical EQT as shown in FIG. 7H) can be chosen from by the encoder and signaled to the decoder.
   a. In one example, a flag is signaled to indicate whether BT or EQT is applied. If EQT is chosen, a following flag is signaled to indicate whether Equal EQT or Non-Equal EQT is chosen. After those one or two flags, a flag indicating whether horizontal or vertical partitioning is signaled. An exemplary codeword table is as below.

TABLE 8

| Codeword | Bin String | Partition types |
|---|---|---|
| 0 | 1 | Qual-Tree |
| 1 | 00 | Non-Split |
| 2 | 0100 | Horizontal BT |
| 3 | 0101 | Vertical BT |
| 4 | 01100 | Equal-Horizontal EQT |
| 5 | 01101 | Equal-Vertical EQT |
| 6 | 01110 | Non-Equal Horizontal EQT |
| 7 | 01111 | Non-Equal Vertical EQT | a. Alternatively, a flag is signaled to indicate whether horizontal or vertical partitioning is applied, followed by a flag indicating whether BT or EQT is applied. If EQT is chosen, a following flag is signaled to indicate whether Equal EQT or Non-Equal EQT is chosen. An exemplary codeword table is as below.

TABLE 9

| Codeword | Bin String | Partition types |
|---|---|---|
| 0 | 1 | Qual-Tree |
| 1 | 00 | Non-Split |
| 2 | 0100 | Horizontal BT |
| 3 | 01010 | Equal-Horizontal EQT |
| 4 | 01011 | Non-Equal-Horizontal EQT |
| 5 | 0110 | Vertical BT |
| 6 | 01110 | Equal-Vertical EQT |
| 7 | 01111 | Non-Equal-Vertical EQT | b. If there is no codeword to represent horizontal BT as claimed in item 3.a. An example of representation of codewords is as follows:

TABLE 10

| Codeword | Bin String | Partition types |
|---|---|---|
| 0 | 1 | Qual-Tree |
| 1 | 00 | Non-Split |
| 2 | 0100 | Equal-Horizontal EQT |
| 3 | 0101 | Non-Equal-Horizontal EQT |
| 4 | 0110 | Vertical BT |
| 5 | 01110 | Equal-Vertical EQT |
| 6 | 01111 | Non-Equal-Vertical EQT |

An alternative example of representation of codewords is as follows:

TABLE 11

| Codeword | Bin String | Partition types |
|---|---|---|
| 0 | 1 | Qual-Tree |
| 1 | 00 | Non-Split |
| 2 | 010 | Vertical BT |
| 3 | 01100 | Equal-Horizontal EQT |
| 4 | 01101 | Equal-Vertical EQT |
| 5 | 01110 | Non-Equal Horizontal EQT |
| 6 | 01111 | Non-Equal Vertical EQT | c. If there is no codeword to represent vertical BT as claimed in item 3.b. An example of representation of codewords is as follows:

TABLE 12

| Codeword | Bin String | Partition types |
|---|---|---|
| 0 | 1 | Qual-Tree |
| 1 | 00 | Non-Split |
| 2 | 010 | Horizontal BT |
| 3 | 01100 | Equal-Horizontal EQT |
| 4 | 01101 | Equal-Vertical EQT |
| 5 | 01110 | Non-Equal Horizontal EQT |
| 6 | 01111 | Non-Equal Vertical EQT |

An alternative example of representation of codewords is as follows:

TABLE 13

| Codeword | Bin String | Partition types |
|---|---|---|
| 0 | 1 | Qual-Tree |
| 1 | 00 | Non-Split |
| 2 | 0100 | Horizontal BT |
| 3 | 01010 | Equal-Horizontal EQT |
| 4 | 01011 | Non-Equal-Horizontal EQT |
| 6 | 0110 | Equal-Vertical EQT |
| 7 | 0111 | Non-Equal-Vertical EQT |

Figure 13:
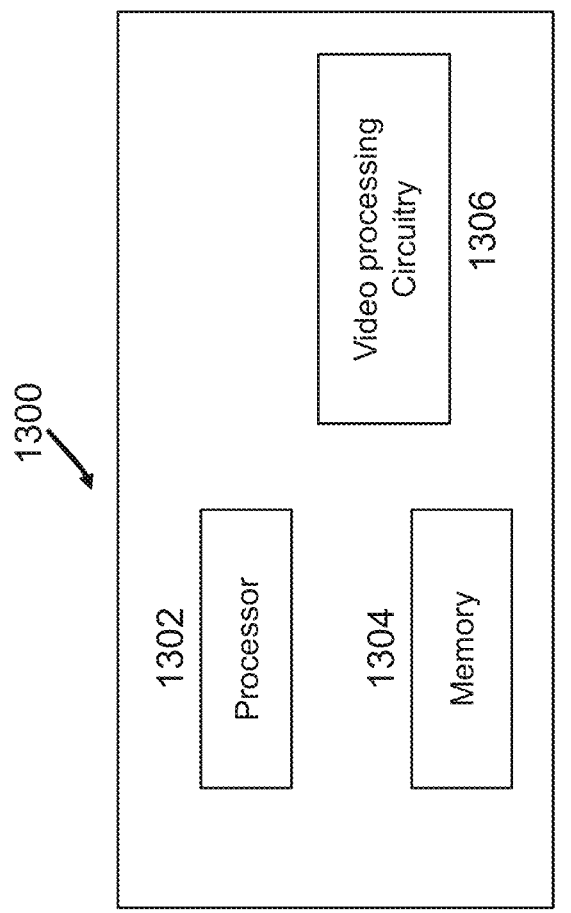
FIG. 13 is a block diagram of an example of a hardware platform for implementing a visual media decoding or a visual media encoding technique described in the present document.
Figure 15B:
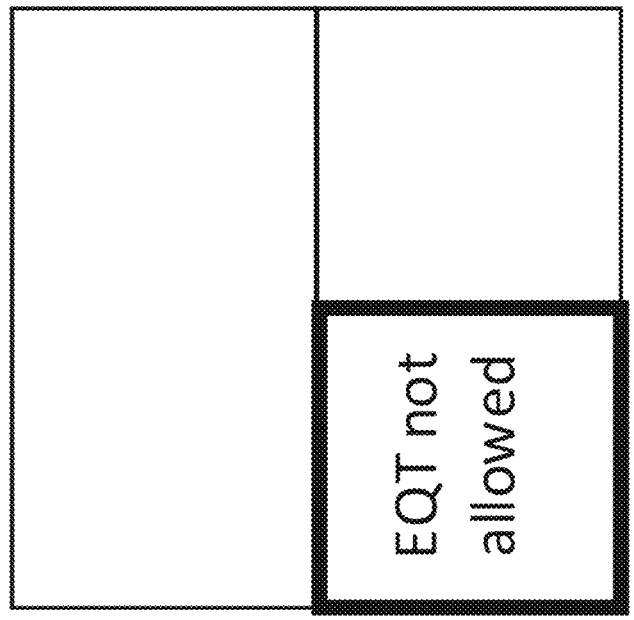
FIGS. 15A-15B depict examples of rules of EQT partitioning.
Figure 15A:
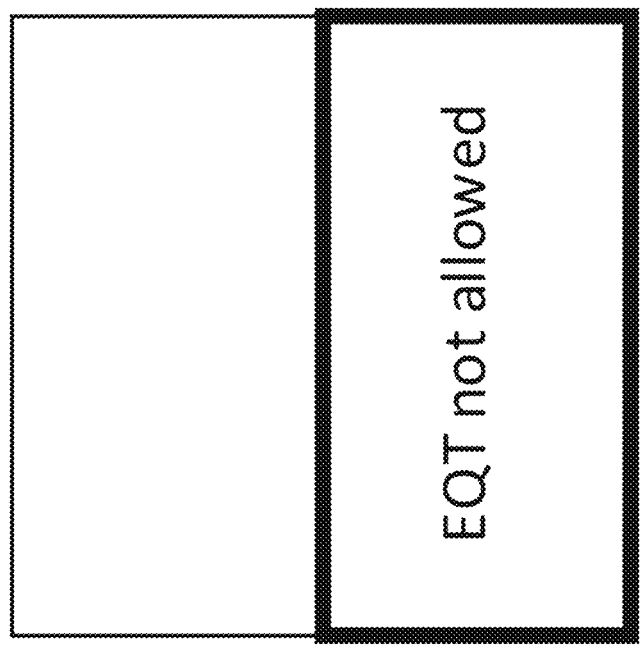

8. Each bin (bit) of a bin string for indications of partition types can be coded by CABAC with one or multiple contexts.
   a. In one example, no-further split (Non-split) mode is treated as one of the partition types.
   b. Alternatively, only partial bins of a bin string may be coded with contexts and remaining bins may be coded with bypass mode (i.e., no context is utilized).
   c. For a bin coded with context, one or multiple contexts may be used.
   d. The context may depend on:
      (a) The position or index of the bin.
      (b) The partitioning of spatial/temporal neighbouring blocks.
      (c) The current partition depth (e.g., QT depth/BT depth) of current block.
      (d) The partition depth (e.g., QT depth/BT depth) of spatial/temporal neighbouring blocks and/or spatial/temporal non-adjacent blocks.
      (e) The coding modes of spatial/temporal neighbouring blocks.
      (f) Slice types/picture types
      (g) Color component
      (h) Statistical results of partition types from previously coded blocks
9. Whether to and how to disallow the redundant partitioning may depend on colour components such as Y/Cb/Cr.
10. Whether to and how to disallow the redundant partitioning may be signaled from encoder to the decoder in VPT/SPS/PPS/slice header/CTU/CU/group of CTUs/ groups of CUs.
11. In some embodiments, EQT is not allowed after BT split. EQT is not allowed for the current block if one or more parent block of the current block is split by BT. FIGS. 15A and 15B show two examples where a block is split from a parent block by one depth of BT FIG. 15A and two depths of BT (FIG. 15B).
   a. The signaling of partitioning depends on whether the block is split from a parent block by one or more depth of BT. In one example, there is no codeword to represent EQT if the block is split from a parent block by one or more depth of BT.
   b. Alternatively, EQT is allowed after BT split.
12. In some embodiments, EQT is not allowed after TT split. EQT is not allowed for the current block if one or more parent block of the current block is split by TT.
   a. Alternatively, EQT is allowed after TT split.
13. In some embodiments, EQT is not allowed after QT split. EQT is not allowed for the current block if one or more parent block of the current block is split by QT.
   a. Alternatively, EQT is allowed after QT split.
14. In some embodiments, QT is not allowed after EQT split. QT is not allowed for the current block if one or more parent block of the current block is split by EQT.
   a. Alternatively, QT is allowed after EQT split.
15. In some embodiments, TT is not allowed after EQT split. TT is not allowed for the current block if one or more parent block of the current block is split by EQT.
   a. Alternatively, TT is allowed after EQT split.
16. In some embodiments, BT is not allowed after EQT split. BT is not allowed for the current block if one or more parent block of the current block is split by EQT.
   a. Alternatively, BT is allowed after EQT split.
17. In some embodiments, EQT is not allowed after EQT split. EQT is not allowed for the current block if one or more parent block of the current block is split by EQT.
   a. Alternatively, EQT is allowed after EQT split.
18. In some embodiments, EQT is not allowed if the shape or size of the current block satisfy some conditions. (Suppose the width and height of the current block are W and H, T1, T2 and T are some integers)
   a. EQT is not allowed if $W>=T1$ and $H>=T2$;
   b. EQT is not allowed if $W>=T1$ or $H>=T2$;
   c. EQT is not allowed if $W<=T1$ and $H<=T2$;
   d. EQT is not allowed if $W<=T1$ or $H<=T2$;
   e. EQT is not allowed if $W \times H <=T$;
   f. EQT is not allowed if $W \times H >=T$;
   g. Horizontal EQT is not allowed if $H<=T$;
   h. Horizontal EQT is not allowed if $H>=T$;
   i. Vertical EQT is not allowed if $W<=T$;
   j. Vertical EQT is not allowed if $W>=T$;
19. In some embodiments, EQT is allowed if the shape or size of the current block satisfy some conditions. (Suppose the width and height of the current block are W and H, T1, T2 and T are some integers)
   a. EQT is allowed if $W>=T1$ and $H>=T2$;
   b. EQT is allowed if $W>=T1$ or $H>=T2$;
   c. EQT is allowed if $W<=T1$ and $H<=T2$;
   d. EQT is allowed if $W<=T1$ or $H<=T2$;
   e. EQT is allowed if $W \times H <=T$;
   f. EQT is allowed if $W \times H >=T$;
   g. Horizontal EQT is allowed if $H<=T$;
   h. Horizontal EQT is allowed if $H>=T$;
   i. Vertical EQT is allowed if $W<=T$;
   j. Vertical EQT is allowed if $W>=T$;
20. In some embodiments, EQT is not allowed if the depth of the current block satisfy some conditions.
   a. EQT is not allowed if the split depth$<=T$;
   b. EQT is not allowed if the split depth$>=T$;
   c. EQT is not allowed if the QT split depth$<=T$;
   d. EQT is not allowed if the QT split depth$>=T$;
   e. EQT is not allowed if the BT split depth$>=T$;
   f. EQT is not allowed if the BT split depth$<=T$;
   g. EQT is not allowed if the TT split depth$>=T$;
   h. EQT is not allowed if the TT split depth$>=T$;
   i. EQT is not allowed if the EQT split depth$<=T$;
   j. EQT is not allowed if the EQT split depth$>=T$;
21. EQT is allowed if the depth of the current block satisfy some conditions.

a. EQT is allowed if the split depth<=T;
b. EQT is allowed if the split depth>=T;
c. EQT is allowed if the QT split depth<=T;
d. EQT is allowed if the QT split depth>=T;
e. EQT is allowed if the BT split depth>=T;
f. EQT is allowed if the BT split depth<=T;
g. EQT is allowed if the TT split depth>=T;
h. EQT is allowed if the TT split depth>=T;
i. EQT is allowed if the EQT split depth<=T;
   EQT is allowed if the EQT split depth>=T;

FIG. 13 shows a block diagram of an example embodiment of a hardware device 1300 that can be utilized to implement various portions of the presently disclosed technology. The hardware device 1300 can be a laptop, a smartphone, a tablet, a camcorder, or other types of devices that are capable of processing videos or visual media of other types, e.g., images. The device 1300 includes a processor or controller 1302 to process data, and memory 1304 in communication with the processor 1302 to store and/or buffer data. For example, the processor 1302 can include a central processing unit (CPU) or a microcontroller unit (MCU). In some implementations, the processor 1302 can include a field-programmable gate-array (FPGA). In some implementations, the device 1300 includes or is in communication with a graphics processing unit (GPU), video processing unit (VPU) and/or wireless communications unit for various visual and/or communications data processing functions of the smartphone device. For example, the memory 1304 can include and store processor-executable code, which when executed by the processor 1302, configures the device 1300 to perform various operations, e.g., such as receiving information, commands, and/or data, processing information and data, and transmitting or providing processed information/data to another device, such as an actuator or external display. To support various functions of the device 1300, the memory 1304 can store information and data, such as instructions, software, values, images, and other data processed or referenced by the processor 1302. For example, various types of Random Access Memory (RAM) devices, Read Only Memory (ROM) devices, Flash Memory devices, and other suitable storage media can be used to implement storage functions of the memory 1304. The device 1300 may further include dedicated video processing circuitry 1306 for performing repetitive computational functions such as transforms and decoding. In some embodiments, the video processing circuitry 1306 may be implemented internal to the processor 1302. In some embodiments, the video processing circuitry 1306 may be a graphics processor unit (GPU).

Figure 14A:
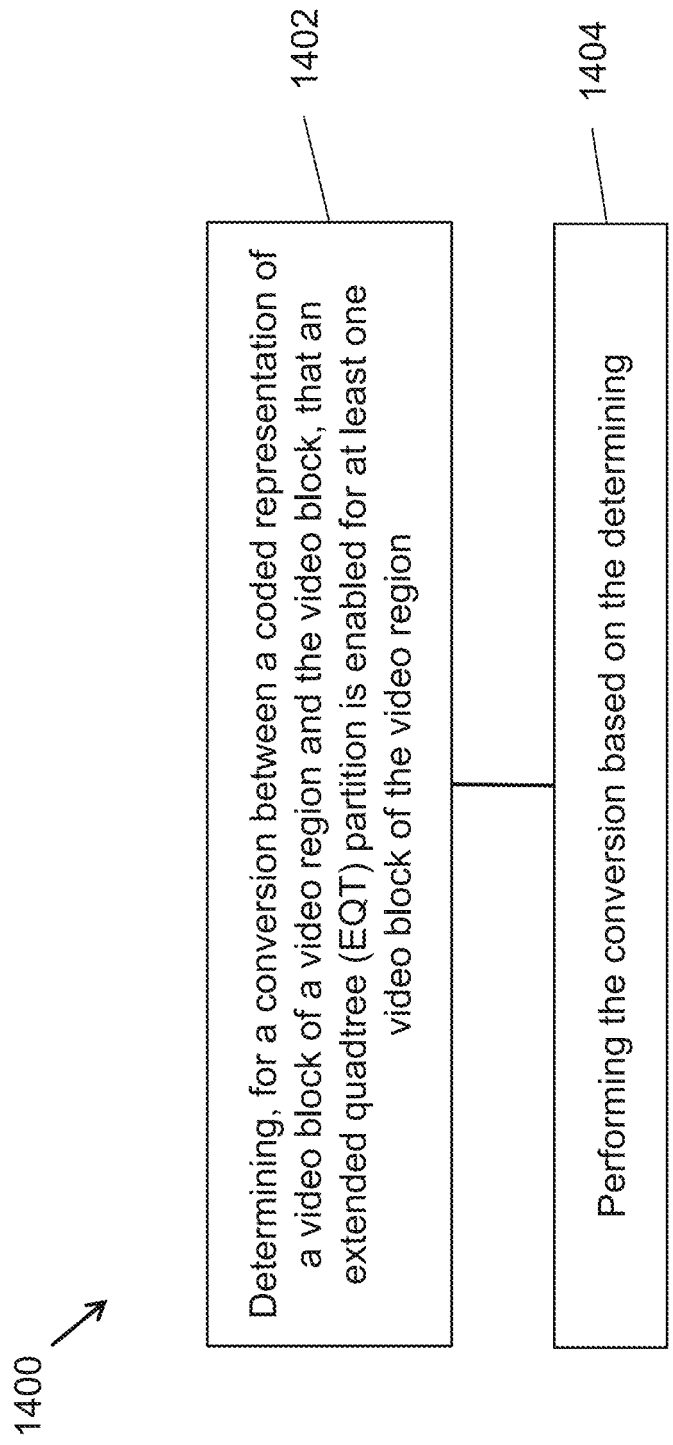
FIGS. 14A-14B are flowcharts showing examples of methods for video processing.

FIG. 14A is a flowchart for an example method 1400 of processing video data. Video data may be, for example, digital video or a digital image. The method 1400 includes determining (1402), for a conversion between a coded representation of a video block of a video region and the video block, that an extended quadtree (EQT) partition is enabled for at least one video block of the video region. The method 1400 also includes performing (1404) the conversion based on the determining, where the EQT partition splits the video block in multiple sub-blocks such that at least one of the multiple sub-blocks has a size that is different from a half width of the video block times a half height of the video block.

In some embodiments, the determining for the conversion between a coded representation of the video block of the video region and the video block includes determining that a binary tree (BT) partition of the video block is disallowed based on a rule. In some embodiments, the rule specifies that, for an M×N video block, where M and N are integers, and for the EQT partition for an M×N/4 structure, a horizontal BT is disallowed in the video block in case that a lower part of the video block is split from a parent block with the horizontal BT and an upper part of the video block also split with the horizontal BT.

In some embodiments, the rule specifies that, for an M×N video block, where M and N are integers, and for the EQT partition for an M/4×N structure, a vertical BT is disallowed in the video block in case that a right part of the video block is split from a parent block with the vertical BT and a left part of the video block is also split with the vertical BT.

In some embodiments, the rule specifies that, for an M×N video block, where M and N are integers, and for the EQT partition for an M×N/4 structure, a horizontal BT is disallowed in the video block in case that the video block includes a center part which is split from a parent block with a horizontal triple tree (TT) partitioning.

In some embodiments, the rule specifies that, for an M×N video block, where M and N are integers, and for the EQT partition for an M/4×N structure, a vertical BT is disallowed in the video block in case that the video block includes a center part which is split from a parent block with a vertical triple tree (TT) partitioning.

In some embodiments, the rule specifies that, for an M×N video block, where M and N are integers, a vertical BT is disallowed in the video block in case that the video block includes a center part which is split from a parent block with a horizontal triple tree (TT) partitioning.

In some embodiments, the rule specifies that, for an M×N video block, where M and N are integers, a horizontal BT is disallowed in the video block in case that the video block includes a center part which is split from a parent block with a vertical triple tree (TT) partitioning.

In some embodiments, syntax elements of the coded representation of the video block is generated using a binarization process that is same as the binarization process for syntax elements of another coded representation of another video block for which the rule is not applied.

In some embodiments, a bitstream includes the coded representation of the video block and includes a codeword for the BT partition process of the video block being disallowed based on the rule, wherein an indication of the BT partition of the video block being disallowed based on the rule is excluded in the bitstream.

In some embodiments, a bitstream includes the coded representation of the video block and excludes a codeword for the BT partition process of the video block being disallowed based on the rule.

In some embodiments, the bitstream excludes the codeword for a horizontal BT for a block in case that a lower part of the video block is split from a parent block with the horizontal BT and an upper part of the video block also split with the horizontal BT.

In some embodiments, the bitstream excludes the codeword for a vertical BT for a block in case that a right part of the video block is split from a parent block with the vertical BT and a left part of the video block is also split with the vertical BT.

In some embodiments, the bitstream excludes the codeword for a horizontal BT for block in case that the video block includes a center part which is split from a parent block with a horizontal triple tree (TT) partitioning.

In some embodiments, the bitstream excludes the codeword for a vertical BT for a block in case that the video block includes a center part which is split from a parent block with a vertical triple tree (TT) partitioning.

In some embodiments, the bitstream excludes the codeword for a vertical BT for a block in case that the video block includes a center part which is split from a parent block with a horizontal triple tree (TT) partitioning.

In some embodiments, the bitstream excludes the codeword for a horizontal BT for a block in case that the video block includes a center part which is split from a parent block with a vertical triple tree (TT) partitioning. In some embodiments, the video region includes one or more video block.

In some embodiments, for the method shown in FIG. 14A, the coded representation of the video block is represented using a codeword from a table that includes mapping between codewords and partition types In some embodiments, the table is shown below:

| Codeword | Bin String | Partition Types |
|---|---|---|
| 0 | 1 | Quad-Tree |
| 1 | 00 | Non-Split |
| 2 | 0100 | Horizontal Binary Tree (BT) |
| 3 | 0101 | Vertical BT |
| 4 | 0110 | Horizontal EQT |
| 5 | 0111 | Vertical EQT |

In some embodiments, a first flag and a second flag are included in the coded representation of the video block, the first flag indicates that EQT partition or BT partition is applied to the video block, the second flag indicates that horizontal partition or vertical partition is applied to the video block, and the first flag precedes the second flag in the coded representation of the video block.

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 0101 | Horizontal EQT |
| 4 | 0110 | Vertical BT |
| 5 | 0111 | Vertical EQT |

In some embodiments, a first flag and a second flag are included in the coded representation of the video block, the first flag indicates that horizontal partition or vertical partition is applied to the video block, the second flag indicates that EQT partition or BT partition is applied to the video block, and the first flag precedes the second flag in the coded representation of the video block.

In some embodiments, the table is shown below:

| Codeword | Bin String | Partition types |
|---|---|---|
| 0 | 1 | Quad-Tree |
| 1 | 00 | Non-Split |
| 2 | 010 | Horizontal EQT |
| 3 | 0110 | Vertical Binary Tree (BT) |
| 4 | 0111 | Vertical EQT |

In some embodiments, the table is shown below:

| Codeword | Bin String | Partition types |
|---|---|---|
| 0 | 1 | Quad-Tree |
| 1 | 00 | Non-Split |
| 2 | 010 | Vertical Binary Tree (BT) |
| 3 | 0110 | Horizontal EQT |
| 4 | 0111 | Vertical EQT |

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 0101 | Vertical EQT |
| 4 | 0110 | Horizontal EQT |

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 0101 | Horizontal EQT |
| 4 | 011 | Vertical EQT |

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 0101 | Vertical BT |
| 4 | 01100 | Equal-Horizontal EQT |
| 5 | 01101 | Equal-Vertical EQT |
| 6 | 01110 | Non-Equal Horizontal EQT |
| 7 | 01111 | Non-Equal Vertical EQT |

In some embodiments, a first flag, a second flag, and a third flag are included in the coded representation of the video block, the first flag indicates that EQT partition or BT partition is applied to the video block, the second flag indicates that equal EQT partition or Non-Equal partition is applied to the video block in response to the EQT partition being applied, the third flag indicates that horizontal partition or vertical partition is applied to the video block, and the first flag precedes the second flag and the second flag precedes the third flag in the coded representation of the video block.

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 01010 | Equal-Horizontal EQT |
| 4 | 01011 | Non-Equal-Horizontal EQT |
| 5 | 0110 | Vertical BT |
| 6 | 01110 | Equal-Vertical EQT |
| 7 | 01111 | Non-Equal-Vertical EQT |

In some embodiments, a first flag, a second flag, and a third flag are included in the coded representation of the video block, the first flag indicates that horizontal partition or vertical partition is applied to the video block, the second flag indicates that EQT partition or BT partition is applied to the video block, the third flag indicates that equal EQT partition or Non-Equal partition is applied to the video block in response to the EQT partition being applied, and the first flag precedes the second flag and the second flag precedes the third flag in the coded representation of the video block.

In some embodiments, the table is shown below:

| Codeword | Bin String | Partition types |
|---|---|---|
| 0 | 1 | Quad-Tree |
| 1 | 00 | Non-Split |
| 2 | 0100 | Equal-Horizontal EQT |
| 3 | 0101 | Non-Equal-Horizontal EQT |
| 4 | 0110 | Vertical Binary Tree (BT) |
| 5 | 01110 | Equal-Vertical EQT |
| 6 | 01111 | Non-Equal-Vertical EQT |

In some embodiments, the table is shown below:

| Codeword | Bin String | Partition types |
|---|---|---|
| 0 | 1 | Quad-Tree |
| 1 | 00 | Non-Split |
| 2 | 010 | Vertical Binary Tree (BT) |
| 3 | 01100 | Equal-Horizontal EQT |
| 4 | 01101 | Equal-Vertical EQT |
| 5 | 01110 | Non-Equal Horizontal EQT |
| 6 | 01111 | Non-Equal Vertical EQT |

In some embodiments, the table is shown below:

| Codeword | Bin String | Partition types |
|---|---|---|
| 0 | 1 | Quad-Tree |
| 1 | 00 | Non-Split |
| 2 | 010 | Horizontal Binary Tree (BT) |
| 3 | 01100 | Equal-Horizontal EQT |
| 4 | 01101 | Equal-Vertical EQT |
| 5 | 01110 | Non-Equal Horizontal EQT |
| 6 | 01111 | Non-Equal Vertical EQT |

In some embodiments, the table is shown below:

| Codeword | Bin String | Partition types |
|---|---|---|
| 0 | 1 | Quad-Tree |
| 1 | 00 | Non-Split |
| 2 | 0100 | Horizontal Binary Tree (BT) |
| 3 | 01010 | Equal-Horizontal EQT |
| 4 | 01011 | Non-Equal-Horizontal EQT |
| 6 | 0110 | Equal-Vertical EQT |
| 7 | 0111 | Non-Equal-Vertical EQT |

In some embodiments, the video region includes one or more video block. In some embodiments, the performing the conversion includes generating the coded representation of the video block. In some embodiments, the performing the conversion includes generating the video block.

In some embodiments, for the method shown in FIG. 14A, the coded representation of the video block includes one or more bits of a bin string that are encoded using a context adaptive binary arithmetic coding (CABAC) technique, and the bin string indicates a partition type for the partitioned video block.

In some embodiments, the CABAC technique encodes the bin string to indicate a no-split mode as one partition type for the partitioned video block.

In some embodiments, the one or more bits comprise a first set of bits and a second set of bits, where the first set of bits are coded with CABAC technique and a second set of bits are coded with bypass mode without utilizing context, and the first set of bits are different from the second set of bits.

In some embodiments, the one or more bits are coded with CABAC technique with one or more contexts. In some embodiments, the one or more contexts for encoding depends on at least one of: (a) a position or an index of a bit, (2) a partitioning of spatial or temporal neighbouring video blocks, (3) a current partition of the video block, (4) a partition depth of spatial or temporal neighbouring video blocks or the partition depth of spatial or temporal non-adjacent video blocks, (5) coding modes of spatial or temporal neighbouring video blocks, (6) slice type or picture type of the video block, (7) color component of the video block, or (8) statistical results of partition types from previously coded video blocks. In some embodiments, the video region includes one or more video block. In some embodiments, the performing the conversion includes generating the coded representation of the video block. In some embodiments, the performing the conversion includes generating the video block.

Figure 14B:
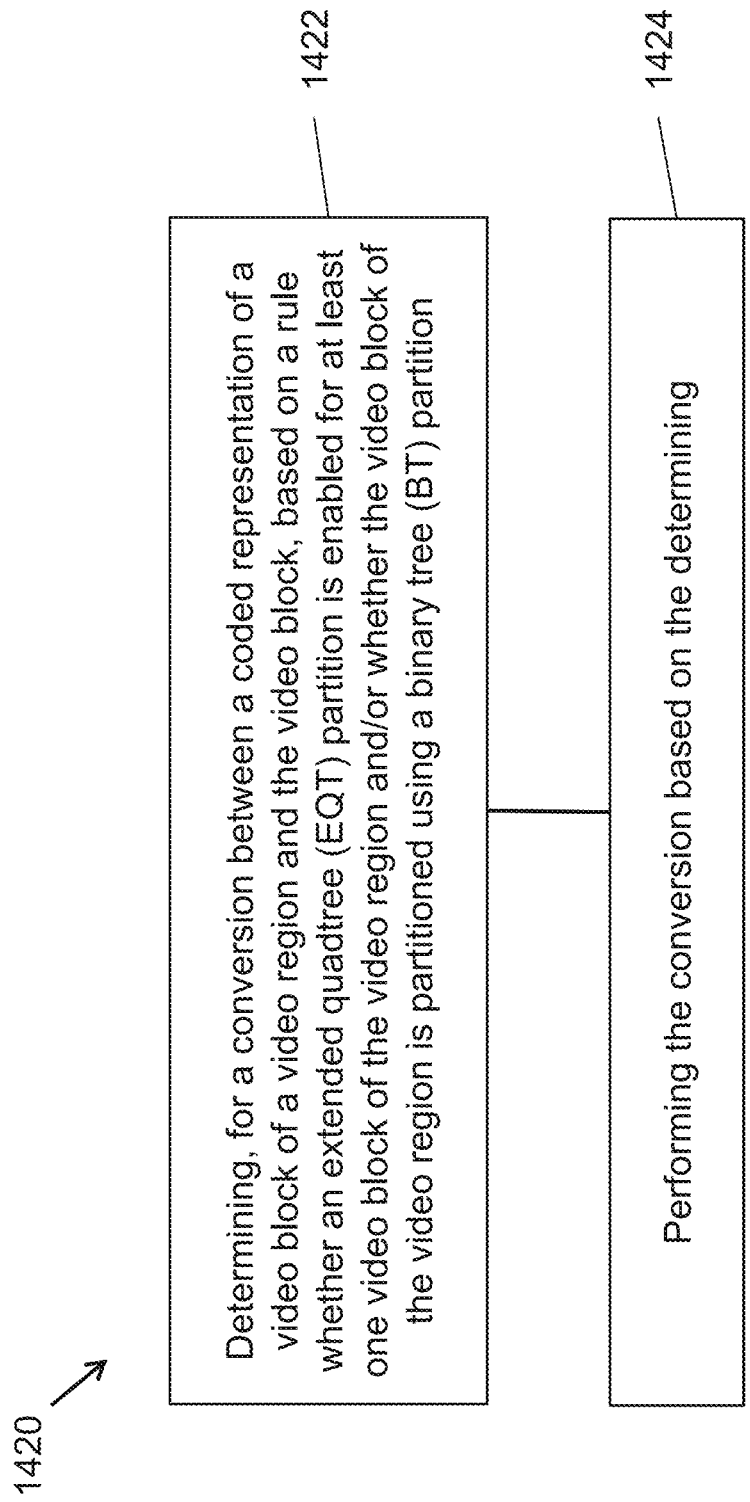

FIG. 14B is a flowchart for an example method 1420 of processing video data. Video data may be, for example, digital video or a digital image. The method 1420 includes determining (1422), for a conversion between a coded representation of a video block of a video region and the video block, based on a rule whether an extended quadtree (EQT) partition is enabled for at least one video block of the video region and/or whether the video block of the video region is partitioned using a binary tree (BT) partition. The method 1420 also includes performing (1424) the conversion based on the determining.

In some embodiments, the rule specifies that the EQT partition is disallowed for the video block after one or more parent video blocks of the video block are split by the BT partition. In some embodiments, the coded representation of the video block excludes a codeword for the EQT partition in response to the video block being split from one or more parent video blocks by one or more depth using the BT partition. In some embodiments, the rule specifies that the EQT partition is allowed for the video block after one or more parent video blocks of the video block are split by the BT partition.

In some embodiments, the rule specifies that the EQT partition is disallowed for the video block after one or more parent video blocks of the video block are split by a Triple Tree (TT) split. In some embodiments, the rule specifies that the EQT partition is allowed for the video block after one or more parent video blocks of the video block are split by a Triple Tree (TT) split. In some embodiments, the rule specifies that the EQT partition is disallowed for the video block after one or more parent video blocks of the video block are split by a Quad Tree (QT) split.

In some embodiments, the rule specifies that the EQT partition is allowed for the video block after one or more parent video blocks of the video block are split by a Quad Tree (QT) split. In some embodiments, the rule specifies that Quad Tree (QT) split is disallowed for the video block after one or more parent video blocks of the video block are split by the EQT partition. In some embodiments, the rule specifies that Quad Tree (QT) split is allowed for the video block after one or more parent video blocks of the video block are split by the EQT partition. In some embodiments, the rule specifies that Triple Tree (TT) split is disallowed for the video block after one or more parent video blocks of the video block are split by the EQT partition.

In some embodiments, the rule specifies that Triple Tree (TT) split is allowed for the video block after one or more parent video blocks of the video block are split by the EQT partition. In some embodiments, the rule specifies that BT partition is disallowed for the video block after one or more parent video blocks of the video block are split by the EQT partition. In some embodiments, the rule specifies that BT partition is allowed for the video block after one or more parent video blocks of the video block are split by the EQT partition. In some embodiments, the rule specifies that the EQT partition is disallowed for the video block after one or more parent video blocks of the video block are split by the EQT partition. In some embodiments, the rule specifies that the EQT partition is allowed for the video block after one or more parent video blocks of the video block are split by the EQT partition.

In some embodiments, the rule is based on the video block being a luminance block or a chrominance block. In some embodiments, the rule is signaled in video parameter set (VPS), sequence parameter set (SPS), picture parameter set (PPS), slice header, coding tree unit (CTU), coding unit (CU), group of CTUs, or groups of CUs.

In some embodiments, the rule specifies that the EQT partition is disallowed in case that dimensions of the video block satisfies one of the following conditions: (a) EQT is disallowed if W>=T1 and H>=T2, (b) EQT is disallowed if W>=T1 or H>=T2, (c) EQT is disallowed if W<=T1 and H<=T2, (d) EQT is disallowed if W<=T1 or H<=T2, (e) EQT is disallowed if W×H<=T, (f) EQT is disallowed if W×H>=T, (g) Horizontal EQT is disallowed if H<=T, (h) Horizontal EQT is disallowed if H>=T, (i) Vertical EQT is disallowed if W<=T, and (j) Vertical EQT is disallowed if W>=T, where width and height in pixels of the video block are W and H, respectively, and wherein T1, T2 and T are integers.

In some embodiments, the rule specifies that the EQT partition is allowed in case that shape or size of the video block satisfies one of the following conditions: (a) EQT is allowed if W>=T1 and H>=T2, (b) EQT is allowed if W>=T1 or H>=T2, (c) EQT is allowed if W<=T1 and H<=T2, (d) EQT is allowed if W<=T1 or H<=T2, (e) EQT is allowed if W×H<=T, (f) EQT is allowed if W×H>=T, (g) Horizontal EQT is allowed if H<=T, (h) Horizontal EQT is allowed if H>=T, (i) Vertical EQT is allowed if W<=T, and (j) Vertical EQT is allowed if W>=T, where width and height in pixels of the video block are W and H, respectively, and wherein T1, T2 and T are integers.

In some embodiments, the rule specifies that the EQT partition is disallowed in case that depth of the video block satisfies one of the following conditions: (a) EQT is disallowed if the split depth<=T, (b) EQT is disallowed if the split depth>=T, (c) EQT is disallowed if the QT split depth<=T, (d) EQT is disallowed if the QT split depth>=T, (e) EQT is disallowed if the BT split depth>=T, (f) EQT is disallowed if the BT split depth<=T, (g) EQT is disallowed if the TT split depth>=T, (h) EQT is disallowed if the TT split depth>=T, (i) EQT is disallowed if the EQT split depth<=T, and (j) EQT is disallowed if the EQT split depth>=T, where T is an integer.

In some embodiments, the rule specifies that the EQT partition is allowed in case that depth of the video block satisfies one of the following conditions: (a) EQT is allowed if the split depth<=T, (b) EQT is allowed if the split depth>=T, (c) EQT is allowed if the QT split depth<=T, (d) EQT is allowed if the QT split depth>=T, (e) EQT is allowed if the BT split depth>=T, (f) EQT is allowed if the BT split depth<=T, (g) EQT is allowed if the TT split depth>=T, (h) EQT is allowed if the TT split depth>=T, (i) EQT is allowed if the EQT split depth<=T, and (j) EQT is allowed if the EQT split depth>=T, where T is an integer.

In some embodiments, the video region includes one or more video block. In some embodiments, the EQT partition is enabled for one video block in the video region or multiple video blocks in the video region. In some embodiments, the EQT partition splits the video block in multiple sub-blocks such that at least one of the multiple sub-blocks has a size that is different from a half width of the video block times a half height of the video block. In some embodiments, the EQT partition splits the video block in four sub-blocks with the same height as that of the video block. In some embodiments, the EQT partition splits the video block in four sub-blocks with the same width as that of the video block.

In some embodiments, the performing the conversion includes generating the coded representation of the video block. In some embodiments, the performing the conversion includes generating the video block.

In some embodiments, the determining operation 1402, 1422 may include receiving a bitstream via a network connection or a locally stored copy of the bitstream, where the bitstream includes the coded representation of the video block. In some embodiments, e.g., during encoding, the bitstream may be received in form of previously coded bits and may be reconstructed from a local memory of the encoder.

In some embodiments, e.g., in visual media decoder apparatus, the performing 1404, 1424 may include generating uncompressed visual data (e.g., video or image) and stored in a display memory or displayed to a user interface.

In some embodiments, e.g., in visual media encoder apparatus, the performing the conversion 1404, 1424 may include generating compressed bitstream representation of visual media and storing the compressed bitstream for future use or transferring the compressed bitstream over a communication connection to a memory or another device.

In some embodiments, a visual media decoder apparatus comprising a processor configured to implement the above described method(s) 1400, 1420 and its additional features. In some embodiments, a visual media encoder apparatus comprising a processor configured to implement the above described method(s) 1400, 1420 and its additional features.

In some embodiments, computer-readable program medium may have code stored thereon. The code comprising instructions that, when executed by a processor, causing the processor to implement the method(s) 1400, 1420 and its additional features described throughout the present document.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

With respect to the methods described herein, the minimum allowed leaf node size or the maximum allowed quadtree depth may be indicated in a field of the bitstream that represents the encoded video. The partitioning process for the given block may be carried selectively based on a condition under which the given block was encoded. The condition may be related to a mode of encoding that is used for encoding the given block or size parameter associated with the given block.

Using the disclosed techniques, in some embodiments, a method of successively partitioning a video block may include partitioning the blocks using one of a number of partitioning possibilities, including BT, TT, QT or EQT. Various rules described herein can be used for controlling which of the partitioning possibilities is used at what depth of partitioning of the block. Furthermore, duplicative end results of partitioning are avoided thereby allowing signaling of final partitioning used based on fewer number of bits.

Figure 16:
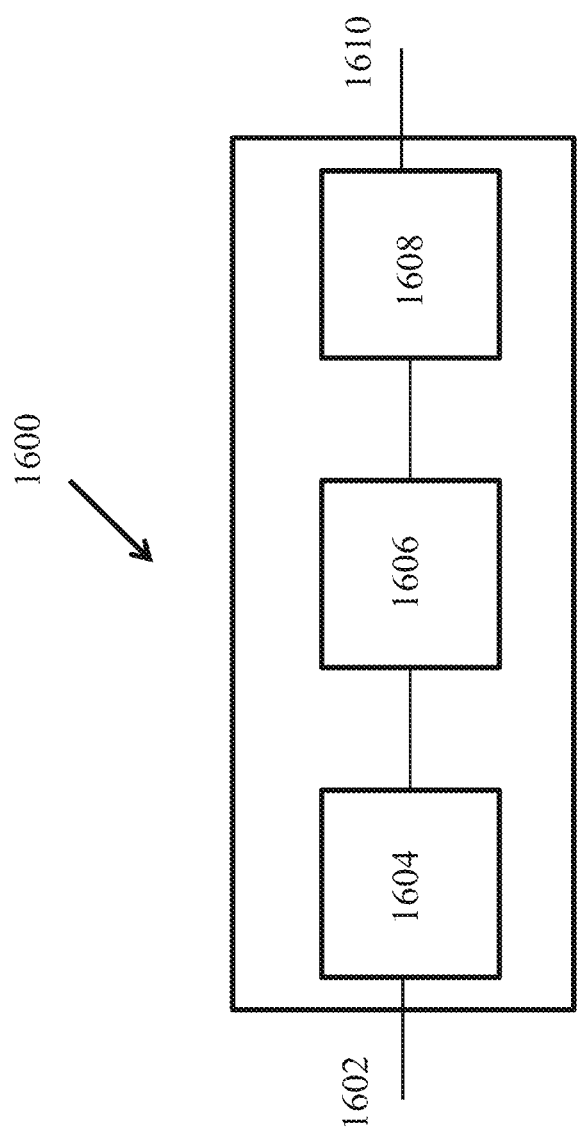
FIG. 16 is a block diagram of an example video processing system in which disclosed techniques may be implemented.

FIG. 16 is a block diagram of an example video processing system in which disclosed techniques may be implemented. FIG. 16 is a block diagram showing an example video processing system 1600 in which various techniques disclosed herein may be implemented. Various implementations may include some or all of the components of the system 1600. The system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of processing video data, comprising:
   determining, for a conversion between a current block of a video and a bitstream of the video, whether an extended quadtree (EQT) partition or other partition is enabled for the current block; and
   performing the conversion based on the determining,
   wherein in response to the EQT partition being enabled for the current block, the current block is split into multiple sub-blocks such that at least one of the multiple sub-blocks has a size that is different from a half width of the current block times a half height of the current block,
   wherein the bitstream includes multiple flags which indicate partition types of the current block, and
   wherein a first flag and a second flag are included in the bitstream, the first flag indicates whether the EQT partition is applied to the current block, the second flag indicates whether a vertical partition is applied to the current block, and the first flag precedes the second flag in the bitstream.

2. The method of claim 1, wherein a third flag and a fourth flag are included in the bitstream, the third flag indicates that whether quadtree (QT) partition is applied to the current block, the fourth flag indicates that whether a hybrid partition is applied to the current block, wherein the hybrid partition includes the EQT partition or a binary tree (BT) partition, and wherein the third flag precedes the fourth flag in the bitstream, and the fourth flag precedes the first flag in the bitstream.

3. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 1 | SPLIT_BT_VER |
| 0 | 1 | 0 | 0 | SPLIT_BT_HOR |
| 0 | 1 | 1 | 1 | SPLIT_EQT_VER |
| 0 | 1 | 1 | 0 | SPLIT_EQT_HOR. |

4. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 1 | 0 | SPLIT_BT_VER |
| 0 | 1 | 0 | 0 | SPLIT_BT_HOR |
| 0 | 1 | 1 | 1 | SPLIT_EQT_VER |
| 0 | 1 | 0 | 1 | SPLIT_EQT_HOR. |

5. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 1 | 0 | SPLIT_BT_VER |
| 0 | 1 | 1 | 1 | SPLIT_EQT_VER |
| 0 | 1 | 0 | 1 | SPLIT_EQT_HOR. |

6. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 1 | SPLIT_BT_VER |
| 0 | 1 | 1 | 1 | SPLIT_EQT_VER |
| 0 | 1 | 1 | 0 | SPLIT_EQT_HOR. |

7. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 0 | SPLIT_BT_HOR |
| 0 | 1 | 0 | 1 | SPLIT_EQT_VER |
| 0 | 1 | 1 | 0 | SPLIT_EQT_HOR. |

8. The method of claim 2, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 0 | SPLIT_BT_HOR |
| 0 | 1 | 0 | 1 | SPLIT_EQT_HOR |
| 0 | 1 | 1 | 0 | SPLIT_EQT_VER. |

9. The method of claim 1, wherein the conversion includes encoding the current block into the bitstream.

10. The method of claim 1, wherein the conversion includes decoding the current block from the bitstream.

11. An apparatus for processing video data comprising a processor and a non-transitory memory with instructions thereon, wherein the instructions upon execution by the processor, cause the processor to:
    determine, for a conversion between a current block of a video and a bitstream of the video, whether an extended quadtree (EQT) partition or other partition is enabled for the current block; and
    perform the conversion based on the determination,
    wherein in response to the EQT partition being enabled for the current block, the current block is split into multiple sub-blocks such that at least one of the multiple sub-blocks has a size that is different from a half width of the current block times a half height of the current block,
    wherein the bitstream includes multiple flags which indicate partition types of the current block, and
    wherein a first flag and a second flag are included in the bitstream, the first flag indicates whether the EQT partition is applied to the current block, the second flag indicates whether a vertical partition is applied to the current block, and the first flag precedes the second flag in the bitstream.

12. The apparatus of claim 11, wherein a third flag and a fourth flag are included in the bitstream, the third flag indicates that whether quadtree (QT) partition is applied to the current block, the fourth flag indicates that whether a hybrid partition is applied to the current block, wherein the hybrid partition includes the EQT partition or a binary tree (BT) partition, and wherein the third flag precedes the fourth flag in the bitstream, and the fourth flag precedes the first flag in the bitstream.

13. The apparatus of claim 12, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 1 | SPLIT_BT_VER |
| 0 | 1 | 0 | 0 | SPLIT_BT_HOR |
| 0 | 1 | 1 | 1 | SPLIT_EQT_VER |
| 0 | 1 | 1 | 0 | SPLIT_EQT_HOR. |

14. The apparatus of claim 12, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 1 | 0 | SPLIT_BT_VER |
| 0 | 1 | 0 | 0 | SPLIT_BT_HOR |
| 0 | 1 | 1 | 1 | SPLIT_EQT_VER |
| 0 | 1 | 0 | 1 | SPLIT_EQT_HOR. |

15. The apparatus of claim 12, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 1 | 0 | SPLIT_BT_VER |
| 0 | 1 | 1 | 1 | SPLIT_EQT_VER |
| 0 | 1 | 0 | 1 | SPLIT_EQT_HOR. |

16. The apparatus of claim 12, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 1 | SPLIT_BT_VER |
| 0 | 1 | 1 | 1 | SPLIT_EQT_VER |
| 0 | 1 | 1 | 0 | SPLIT_EQT_HOR. |

17. The apparatus of claim 12, wherein the relationship between the first flag to the fourth flag and partition types is shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 0 | SPLIT_BT_HOR |
| 0 | 1 | 0 | 1 | SPLIT_EQT_VER |
| 0 | 1 | 1 | 0 | SPLIT_EQT_HOR. |

18. The apparatus of claim 12, wherein the relationship between the first flag to the fourth flag and partition types is as shown below:

| the third flag | the fourth flag | the first flag | the second flag | partition type |
|---|---|---|---|---|
| 0 | 0 | 0 | 0 | NO_SPLIT |
| 1 | 0 | 0 | 0 | SPLIT_QT |
| 0 | 1 | 0 | 0 | SPLIT_BT_HOR |
| 0 | 1 | 0 | 1 | SPLIT_EQT_HOR |
| 0 | 1 | 1 | 0 | SPLIT_EQT_VER. |

19. A non-transitory computer-readable storage medium storing instructions that cause a processor to:

determine, for a conversion between a current block of a video and a bitstream of the video, whether an extended quadtree (EQT) partition or other partition is enabled for the current block; and perform the conversion based on the determination, wherein in response to the EQT partition being enabled for the current block, the current block is split into multiple sub-blocks such that at least one of the multiple sub-blocks has a size that is different from a half width of the current block times a half height of the current block, wherein the bitstream includes multiple flags which indicate partition types of the current block, and wherein a first flag and a second flag are included in the bitstream, the first flag indicates whether the EQT partition is applied to the current block, the second flag indicates whether a vertical partition is applied to the current block, and the first flag precedes the second flag in the bitstream.

20. A non-transitory computer-readable recording medium storing a bitstream of a video which is generated by a method performed by a video processing apparatus, wherein the method comprises:

determining, for a conversion between a current block of a video and a bitstream of the video, whether an extended quadtree (EQT) partition or other partition is enabled for the current block; and generating the bitstream from the current block based on the determining, wherein in response to the EQT partition being enabled for the current block, the current block is split into multiple sub-blocks such that at least one of the multiple sub-blocks has a size that is different from a half width of the current block times a half height of the current block, wherein the bitstream includes multiple flags which indicate partition types of the current block, and wherein a first flag and a second flag are included in the bitstream, the first flag indicates whether the EQT partition is applied to the current block, the second flag indicates whether a vertical partition is applied to the current block, and the first flag precedes the second flag in the bitstream.

\* \* \* \* \*